(12) United States Patent
Peng et al.

(10) Patent No.: US 12,719,673 B2
(45) Date of Patent: Aug. 25, 2026

(54) PRIVACY-PRESERVING COMPUTATION METHOD AND APPARATUS FOR SECURE THREE-PARTY MATRIX HYBRID MULTIPLICATION

(71) Applicant: Beihang University, Beijing (CN)

(72) Inventors: Shizhao Peng, Beijing (CN); Haogang Zhu, Beijing (CN); Derun Zhao, Beijing (CN)

(73) Assignee: Beihang University, Beijing (CN)

( * ) Notice: Subject to any disclaimer, the term of this patent is extended or adjusted under 35 U.S.C. 154(b) by 143 days.

(21) Appl. No.: 18/601,326

(22) Filed: Mar. 11, 2024

(65) Prior Publication Data

US 2025/0106016 A1 Mar. 27, 2025

(30) Foreign Application Priority Data

Sep. 21, 2023 (CN) ........................ 202311227165.8

(51) Int. Cl.
*H04L 9/08* (2006.01)
*G06F 17/16* (2006.01)
(Continued)

(52) U.S. Cl.
CPC ............ *H04L 9/0869* (2013.01); *G06F 17/16* (2013.01); *G06F 21/602* (2013.01);
(Continued)

(58) Field of Classification Search
CPC . H04L 9/0869; H04L 2209/46; H04L 9/0861; G06F 17/16; G06F 21/602; G06F 21/6245; G06F 21/71
See application file for complete search history.

(56) References Cited

U.S. PATENT DOCUMENTS 10,102,265 B1 * 10/2018 Madisetti ............... G06Q 20/06
10,873,461 B2 * 12/2020 Gupta .................. H04L 9/3013
(Continued)

FOREIGN PATENT DOCUMENTS

CN 111737011 A * 10/2020 ............. H04L 67/10
CN 112631767 A * 4/2021 ......... G06F 21/6245
(Continued)

OTHER PUBLICATIONS

Do, H. G., & Ng, W. K. (Mar. 2016). Privacy-preserving triangle counting in distributed graphs. In 2016 IEEE 30th International Conference on Advanced Information Networking and Applications (AINA) (pp. 917-924). IEEE. (Year: 2016).*
(Continued)

*Primary Examiner* — Philip J Chea
*Assistant Examiner* — Dorianne Alvarado David
(74) *Attorney, Agent, or Firm* — Carter, DeLuca & Farrell, LLP

(57) ABSTRACT

The present disclosure discloses a privacy-preserving computation method and apparatus for secure three-party matrix hybrid multiplication, and relates to the field of privacy-preserving computation technologies. The present disclosure focuses on a secure three-party matrix hybrid multiplication problem. Specifically, a secure two-party matrix multiplication protocol and a secure three-party matrix multiplication protocol are constructed. Then, a privacy-preserving computation request is obtained, and the privacy-preserving computation request is decoded to obtain a decoded privacy-preserving computation request. Finally, the secure two-party matrix multiplication protocol or the secure three-party matrix multiplication protocol is matched based on the decoded privacy-preserving computation request, to complete privacy-preserving computation of each participant. In this way, privacy-preserving computation can be imple-
(Continued)

mented in a high-efficient, secure, and reliable manner. In addition, high coupling performance is achieved.

17 Claims, 9 Drawing Sheets

(51) Int. Cl.
*G06F 21/60* (2013.01)
*G06F 21/62* (2013.01)
*G06F 21/71* (2013.01)

(52) U.S. Cl.
CPC .......... *G06F 21/6245* (2013.01); *G06F 21/71* (2013.01); *H04L 9/0861* (2013.01); *H04L 2209/46* (2013.01)

(56) References Cited

U.S. PATENT DOCUMENTS

| | | | | |
|---|---|---|---|---|
| 11,386,212 | B2 * | 7/2022 | Li | G06F 21/62 |
| 2009/0282039 | A1 * | 11/2009 | Diamond | H04L 9/3066 |
| 2018/0205707 | A1 * | 7/2018 | Bellala | H04L 9/085 |
| 2018/0219842 | A1 * | 8/2018 | Bellala | H04L 67/12 |
| 2018/0276417 | A1 * | 9/2018 | Cerezo Sanchez | H04L 9/008 |
| 2020/0304293 | A1 * | 9/2020 | Gama | H04L 9/00 |
| 2022/0038285 | A1 * | 2/2022 | Youssef | H04L 9/3252 |
| 2022/0091891 | A1 * | 3/2022 | Lv | G06F 16/27 |
| 2022/0092216 | A1 * | 3/2022 | Mohassel | G06F 21/6245 |
| 2023/0059492 | A1 * | 2/2023 | Vinayagamurthy | G06F 16/24565 |
| 2023/0179406 | A1 * | 6/2023 | Yanai | H04L 9/0869 380/44 |
| 2023/0385446 | A1 * | 11/2023 | Liu | H04L 9/008 |
| 2024/0129105 | A1 * | 4/2024 | Yanai | H04L 9/0861 |
| 2024/0220645 | A1 * | 7/2024 | Wu | G06F 21/6245 |
| 2024/0394407 | A1 * | 11/2024 | Choudhary | G06F 21/6254 |
| 2025/0131115 | A1 * | 4/2025 | Wang | H04L 9/085 |
| 2025/0182123 | A1 * | 6/2025 | Das | G06Q 40/02 |
| 2025/0219812 | A1 * | 7/2025 | Paunoiu | H04L 9/0869 |
| 2025/0225266 | A1 * | 7/2025 | Pan | G06F 21/6245 |

FOREIGN PATENT DOCUMENTS

| | | | | |
|---|---|---|---|---|
| CN | 113849806 A | * | 12/2021 | G06F 21/602 |
| CN | 115065461 A | * | 9/2022 | H04L 9/085 |
| CN | 115865306 A | * | 3/2023 | |
| CN | 117290866 A | * | 12/2023 | G06F 17/16 |
| WO | WO-2023014929 A1 | * | 2/2023 | H04L 9/3242 |

OTHER PUBLICATIONS

Du, W., & Zhan, Z. (Sep. 2002). A practical approach to solve secure multi-party computation problems. In Proceedings of the 2002 workshop on New security paradigms (pp. 127-135). (Year: 2002).*

Liu, L., Chen, X., & Lou, W. (2016). Secure three-party computational protocols for triangle area. International Journal of Information Security, 15(1), 1-13. (Year: 2016).*

Lu, W. J., & Sakuma, J. (Jan. 2018). More practical privacy-preserving machine learning as a service via efficient secure matrix multiplication. In Proceedings of the 6th Workshop on Encrypted Computing & Applied Homomorphic Cryptography (pp. 25-36). (Year: 2018).*

Trinca, D., & Rajasekaran, S. (Apr. 2007). Towards a collusion-resistant algebraic multi-party protocol for privacy-preserving association rule mining in vertically partitioned data. In 2007 IEEE International Performance, Computing, and Communications Conference (pp. 402-409). IEEE. (Year: 2007).*

Van Daalen, F., Ippel, L., Dekker, A., & Bermejo, I. (Jan. 23, 2023). Privacy Preserving n-Party Scalar Product Protocol. IEEE Transactions on Parallel and Distributed Systems, 34(4), 1060-1066. (Year: 2023).*

Wagh, S., Gupta, D., & Chandran, N. (2019). SecureNN: 3-party secure computation for neural network training. Proceedings on Privacy Enhancing Technologies. (Year: 2019).*

Wang, T., & Luo, W. (Feb. 2009). Design and analysis of private-preserving dot product protocol. In 2009 International Conference on Electronic Computer Technology (pp. 531-535). IEEE. (Year: 2009).*

Van Daalen, et al. (Jan. 23, 2023). Privacy Preserving n-Party Scalar Product Protocol. IEEE Transactions on Parallel and Distributed Systems, 34(4), 1060-1066. (Year: 2023).*

* cited by examiner

| Module | Protocol flowchart | Relationship | Security analysis under malicious attacks | | |
|---|---|---|---|---|---|
| | | | Process-level security | Result-level security | |
| Module 1 | $A_1^*A_2^*$, C → 2PMP → $V_{a0}$, $V_{c0}$ | $M_0=A_1*A_2*C=V_{a0}+V_{c0}$ | Process-level security can be ensured based on the 2PMP protocol | $V_{a0}$ leakage | Due to incomplete information, Carol cannot reversely deduce $A_1^*$ and $A_2^*$ based on $M_0 = A_1^*A_2^*C$ |
| | | | | $V_{c0}$ leakage | Due to $r(A_1^* \times A_2^*) \le min\{r(A_1^*), r(A_2^*)\} < s$, Alice cannot obtain $C$ based on a non-full-rank matrix $A_1^*A_2^*$ and $M_0 = A_1^*A_2^*C$ |
| Module 2 | $A_1^*$, $B_2^*$, C → 3PMP → $V_{a1}$, $V_{b2}$, $V_{c1}$ | $M_1=A_1*A_2*C=V_{a1}+V_{b1}+V_{c1}$ | Process-level security can be ensured based on the 3PMP protocol | $V_{a1}$ leakage | Due to incomplete information, Bob and Carol cannot reversely deduce $A_1^*$ based on $M_1 = A_1^*B_2^*C$ |
| | | | | $V_{b1}$ leakage | Due to incomplete information, Alice and Carol cannot reversely deduce $B_2^*$ based on $M_1 = A_1^*B_2^*C$ |
| | | | | $V_{c1}$ leakage | Due to incomplete information, Alice and Bob cannot reversely deduce $C$ based on $M_1 = A_1^*B_2^*C$ |
| Module 3 | $B_1^*$, $A_2^*$, C → 3PMP → $V_{b1}$, $V_{a2}$, $V_{c2}$ | $M_2=B_1*B_2*C=V_{a2}+V_{b2}+V_{c2}$ | Process-level security can be ensured based on the 3PMP protocol | $V_{a2}$ leakage | Due to incomplete information, Bob and Carol cannot reversely deduce $A_2^*$ based on $M_2 = B_1^*A_2^*C$ |
| | | | | $V_{b2}$ leakage | Due to incomplete information, Alice and Carol cannot reversely deduce $B_1^*$ based on $M_2 = B_1^*A_2^*C$ |
| | | | | $V_{c2}$ leakage | Due to incomplete information, Alice and Bob cannot reversely deduce $C$ based on $M_2 = B_1^*A_2^*C$ |
| Module 4 | $B_1^*B_2^*$, C → 2PMP → $V_{b3}$, $V_{c3}$ | $M_3=B_1*B_2*C=V_{b3}+V_{c3}$ | Process-level security can be ensured based on the 2PMP protocol | $V_{b3}$ leakage | Due to incomplete information, Carol cannot perform reverse deduction based on $M_3 = B_1^*B_2^*C$ |
| | | | | $V_{c3}$ leakage | Due to $r(B_1^* \times B_2^*) \le min\{r(B_1^*), r(B_2^*)\} < s$, Bob cannot obtain $C$ based on a non-full-rank matrix $B_1^*B_2^*$ and $M_3 = B_1^*B_2^*C$ |

FIG. 9

PRIVACY-PRESERVING COMPUTATION METHOD AND APPARATUS FOR SECURE THREE-PARTY MATRIX HYBRID MULTIPLICATION

CROSS REFERENCE TO RELATED APPLICATION

This patent application claims the benefit and priority of Chinese Patent Application No. 2023112271658, filed with the China National Intellectual Property Administration on Sep. 21, 2023, the disclosure of which is incorporated by reference herein in its entirety as part of the present application.

TECHNICAL FIELD

The present disclosure relates to the field of privacy-preserving computation technologies, and in particular, to a privacy-preserving computation method and apparatus for secure three-party matrix hybrid multiplication.

BACKGROUND

With the innovation and application of artificial intelligence and big data technologies, the world has officially entered the "data-driven" era, and data has become an important strategic resource for countries and enterprises. However, in the era of big data, it is necessary to achieve opening and sharing of data. Therefore, how to realize "availability but invisibility" of the data, to solve a problem of a data island to realize the interconnection and fusion analysis of the data becomes an urgent problem to be solved. A privacy-preserving computation technology not only realizes safe circulation of the data but also effectively ensures separation of data ownership and data use right on the premise that original data privacy is effectively guaranteed not to be disclosed. The privacy-preserving computation technology is widely used in scenarios such as collaborative big data mining, collaborative modeling in machine learning, and the like. However, model computation processes in all these scenarios generally involve complex operations of hybrid addition and multiplication of multi-party data. For example, for a three-party secure linear regression problem that exists when labeled data Y is not disclosed to a third party, an intermediate computation process of $(A_1+B_1)\cdot(A_2+B_2)\cdot Y$ for computing a regression coefficient $\beta=(X^TX)^{-1}X^TY$ involves secure three-party matrix hybrid multiplication.

Benjamin and Atallah have designed an outsourced matrix hybrid computation solution based on a homomorphic encryption technology, where the solution can be verified by one or more servers. User computational complexity of the solution is $O(n^2t^2)$, where n and t represent an order and a threshold of a matrix respectively. The homomorphic encryption-based computation solution provided by Benjamin and Atallah effectively ensures input data privacy and computational verifiability, but greatly reduces computation efficiency due to use of the homomorphic encryption technology. In addition, collusion attacks to an outsourced third-party cloud service provider in this solution easily occur.

Based on different cryptographic hardness assumptions (such as a co-computational Diffie-Hellman (co-CDH) hardness assumption and a deterministic linear hardness assumption) and a secret sharing technology, researchers such as Fiore have constructed a publicly verifiable model for performing high-order polynomial computation and matrix multiplication computation in an apportioned manner. The secret sharing-based solution provided by the researchers such as Fiore improves overall computational security, but substantially increases computation overheads due to a variety of public-key cryptography tools used in this solution. In addition, quantities of finite rings and fields involved in the secret sharing-based solution are limited, and therefore computation precision is inadequate.

Researchers such as Zhen and Jia have constructed, with reference to an oblivious transfer protocol, a secure two-party matrix hybrid computing protocol that can be used to solve an n-order matrix equation. However, the solution that is based on the oblivious transfer protocol $$OT_1^n$$

involves a large quantity of rounds of communication interaction. Therefore, for a large-scale data matrix hybrid multiplication task, communication costs are high and computation efficiency is low.

In addition, all the foregoing solutions are implemented based on cryptographic technology stacks, which can ensure security in a semi-honest environment. However, a problem that leakage of an output result may cause a risk to original data privacy is unsolved when secure two-party matrix computation is involved. Specifically, the following prior-art problems are involved:

(1) Most existing solutions to a problem involving secure three-party matrix hybrid multiplication use cryptographic technology stacks such as homomorphic encryption, oblivious transfer, and secret sharing to serially perform each corresponding step subsequent to hybrid multiplication decomposition. Consequently, complexity of ciphertext space computation is significantly increased and communication overheads double.

(2) Most existing protocols involving secure three-party matrix hybrid multiplication are based on a semi-honest environment, and ignore a result security problem caused by an input full-rank matrix in a data leakage environment.

(3) Most existing solutions to a problem involving secure three-party matrix hybrid multiplication rely on an outsourced cloud service computing system. If a third-party cloud service computing node is not highly trustworthy or is attacked by a malicious node, key leakage may occur, and a security risk of original data privacy leakage may be further caused.

(4) Most existing solutions to a problem involving secure three-party matrix hybrid multiplication use a large prime number for encryption. This increases a quantity of ciphertext digits in a computing space. In addition, the quantity of ciphertext digits is fixed. Consequently, numerical computation accuracy is inadequate, and reliability of a computation result is affected.

SUMMARY

To solve the foregoing prior-art problems, the present disclosure provides a privacy-preserving computation method and apparatus for secure three-party matrix hybrid multiplication.

To achieve the foregoing objective, the present disclosure provides the following solutions.

A privacy-preserving computation method for secure three-party matrix hybrid multiplication is provided, including:

- constructing a secure two-party matrix multiplication protocol and a secure three-party matrix multiplication protocol;
- obtaining a privacy-preserving computation request, and decoding the privacy-preserving computation request to obtain a decoded privacy-preserving computation request; and
- matching the secure two-party matrix multiplication protocol or the secure three-party matrix multiplication protocol based on the decoded privacy-preserving computation request, to complete privacy-preserving computation of each participant.

A privacy-preserving computation apparatus for secure three-party matrix hybrid multiplication, configured to implement the foregoing privacy-preserving computation method for secure three-party matrix hybrid multiplication. The apparatus includes a client and a plurality of participant nodes, and each of the plurality of participant nodes exchanges data with the client.

The client is configured to: generate a privacy-preserving computation request, and collect privacy-preserving computation results of the plurality of participant nodes.

Each of the plurality of participant nodes is configured to: construct a secure two-party matrix multiplication protocol and a secure three-party matrix multiplication protocol; obtain the privacy-preserving computation request, and decode the privacy-preserving computation request to obtain a decoded privacy-preserving computation request; and match the secure two-party matrix multiplication protocol or the secure three-party matrix multiplication protocol based on the decoded privacy-preserving computation request, to complete privacy-preserving computation of each participant.

According to specific embodiments provided in the present disclosure, the present disclosure has the following technical effects:

The present disclosure focuses on a secure three-party matrix hybrid multiplication problem. Specifically, a secure two-party matrix multiplication protocol and a secure three-party matrix multiplication protocol are constructed. Then, a privacy-preserving computation request is obtained, and the privacy-preserving computation request is decoded to obtain a decoded privacy-preserving computation request. Finally, the secure two-party matrix multiplication protocol or the secure three-party matrix multiplication protocol is matched based on the decoded privacy-preserving computation request, to complete privacy-preserving computation of each participant. In this way, privacy-preserving computation can be implemented in a high-efficient, secure, and reliable manner. In addition, high coupling performance is achieved.

BRIEF DESCRIPTION OF THE DRAWINGS

To describe technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

FIG. 9 is a security status analysis diagram for a data exposure environment according to an embodiment of the present disclosure.

DETAILED DESCRIPTION OF THE EMBODIMENTS

Figure 1:
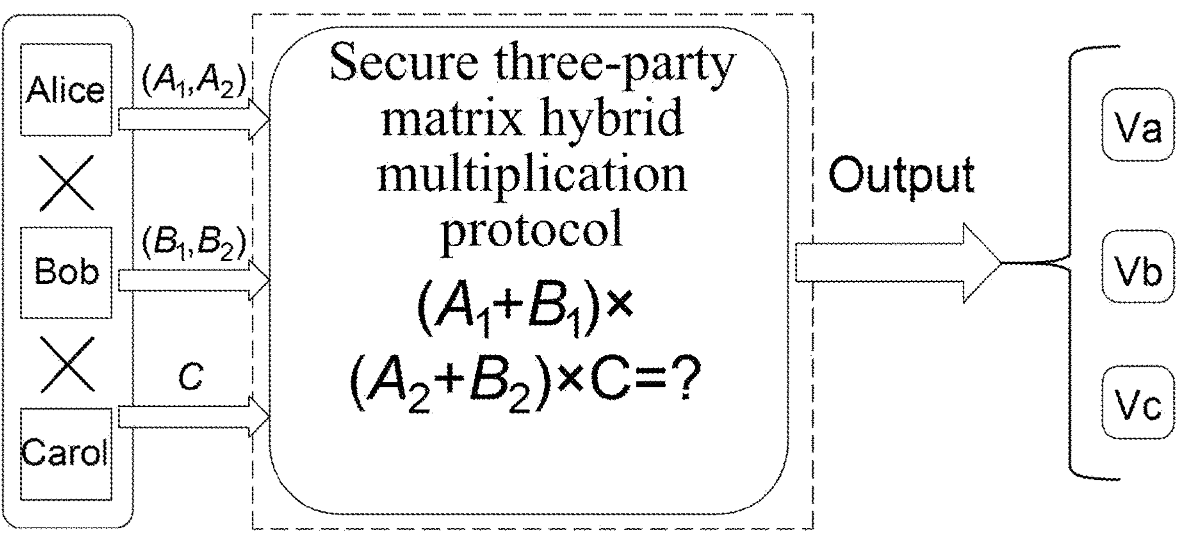
FIG. 1 is a schematic diagram of a secure three-party matrix hybrid multiplication problem according to an embodiment of the present disclosure.

The technical solutions in embodiments of the present disclosure are clearly and completely described below with reference to the drawings in the embodiments of the present disclosure. Apparently, the described embodiments are merely some but not all of the embodiments of the present disclosure. All other embodiments obtained by those skilled in the art based on the embodiments of the present disclosure without creative efforts shall fall within the protection scope of the present disclosure.

Terms (1) Semi-honest adversaries security (Semi-Honest Adversaries Security) is a specific protocol assuming that all computation participants honestly perform privacy-preserving computation and perform each procedure in strict accordance with the protocol, but there are some risks caused by a corrupt participant who attempts to infer privacy of another participant based on an intermediate or final result obtained in a protocol execution process.

(2) Secure two-party matrix multiplication protocol (2PMP, Secure Two-Party Matrix Multiplication Protocol) is a protocol assuming that there are two participants P1 and P2 who distrust each other. The participants have secret input matrices x and y respectively, and collaboratively perform a two-party multiplication protocol $f(x, y)=\text{Output}(v_1, v_2)=x\cdot y$. Finally, the participants obtain corresponding outputs $v_1$ and $v_2$ respectively, where the outputs satisfy a formula of $v_1+v_2=x\cdot y$. Throughout a computation process, each participant knows only input and output data involved in the computation process of the participant, and cannot obtain any intermediate computation result of another participant.

(3) Secure three-party matrix multiplication protocol (3PMP, Secure Three-Party Matrix Multiplication Protocol) is a protocol assuming that there are three participants P1, P2, and P3 who distrust each other. The participants have secret input matrices x, y, and z respectively, and collaboratively perform a two-party multiplication protocol $f(x, y, z)=Output(v_1, v_2, v_3)=x \cdot y \cdot z$. Finally, the participants obtain corresponding outputs $v_1$, $v_2$, and $v_3$ respectively, where the outputs satisfy a formula of $v_1+v_2+v_3=x \cdot y \cdot z$. Throughout a computation process, each participant knows only input and output data involved in the computation process of the participant, and cannot obtain any intermediate computation result of another participant.

(4) Secure three-party matrix hybrid multiplication protocol (3PHMP, Secure Three-Party Matrix Hybrid Multiplication Protocol) is a protocol assuming that there are three participants P1, P2, and P3 who distrust each other. The participants have secret input matrices $(x_1, x_2)$, $(y_1, y_2)$, and z respectively, and collaboratively perform a three-party hybrid multiplication protocol $f((x_1, x_2), (y_1, y_2), z)=Output(v_1,v_2,v_3)=(x_1+y_1) \cdot (x_2+y_2) \cdot z$. Finally, the participants obtain corresponding outputs $v_1$, $v_2$, and $v_3$ respectively, where the outputs satisfy a formula of $v_1+v_2+v_3=(x_1+y_1) \cdot (x_2+y_2) \cdot z$. Throughout a computation process, each participant knows only input and output data involved in the computation process of the participant, and cannot obtain any intermediate computation result of another participant.

(5) Data obfuscation technique (Data Disguising Methodology) is a data protection means to protect an intermediate result of secure multi-party computation. The technique randomly splits a computation result to form a linear combination to achieve the protection effect of "one-time pad".

(6) Privacy-preserving computation (Privacy-Preserving Computation) refers to a series of information technologies that perform data analysis and computation on the premise that a data provider does not leak original data, which ensures that data is "available but invisible" during circulation and fusion.

The present disclosure aims to provide a privacy-preserving computation method and apparatus for secure three-party matrix hybrid multiplication. It focuses on a secure three-party matrix hybrid multiplication problem, to implement a privacy-preserving computation method and apparatus that are used for secure three-party matrix hybrid multiplication and that feature high-efficiency, safety, reliability, and high coupling performance.

In order to make the above objective, features and advantages of the present disclosure clearer and more comprehensible, the present disclosure is further described in detail below with reference to the accompanying drawings and specific implementations.

I. Secure Three-Party Matrix Hybrid Multiplication Problem

There are three independent participants Alice, Bob, and Carol (that is, a first participant, a second participant, and a third participant respectively, which are same as those described below) who distrust each other. The participant Alice has a group of private data matrices $A_1 \in R^{m \times t}$ and $A_2 \in R^{t \times s}$ that are stored only on a computing node of Alice. The participant Bob has a group of private data matrices $B_1 \in R^{m \times t}$ and $B_2 \in R^{t \times s}$ that are stored only on a computing node of Bob. The participant Carol has a private data matrix $C \in R^{s \times n}$ that is stored only on a computing node of Carol. The three participants collaboratively perform a secure three-party matrix hybrid multiplication protocol $f((A_1, A_2), (B_1, B_2), C)=(A_1+B_1) \times (A_2+B_2) \times C=V_a+V_b+V_c$. Finally, the participants respectively obtain corresponding private output matrices $V_a$, $V_b$, $V_c \in R^{m \times n}$, and send the private output matrices to a computation requester for summarization, so as to obtain a three-party matrix hybrid multiplication result desired by the participants. In a computation process, each participant can obtain only input and output information involved in the computation process of the participant, but cannot obtain an intermediate computation result and private data information of another participant. For a formalized description of the problem, refer to FIG. 1.

II. Secure Two-Party Matrix Multiplication Protocol (2PMP)

Figure 2:
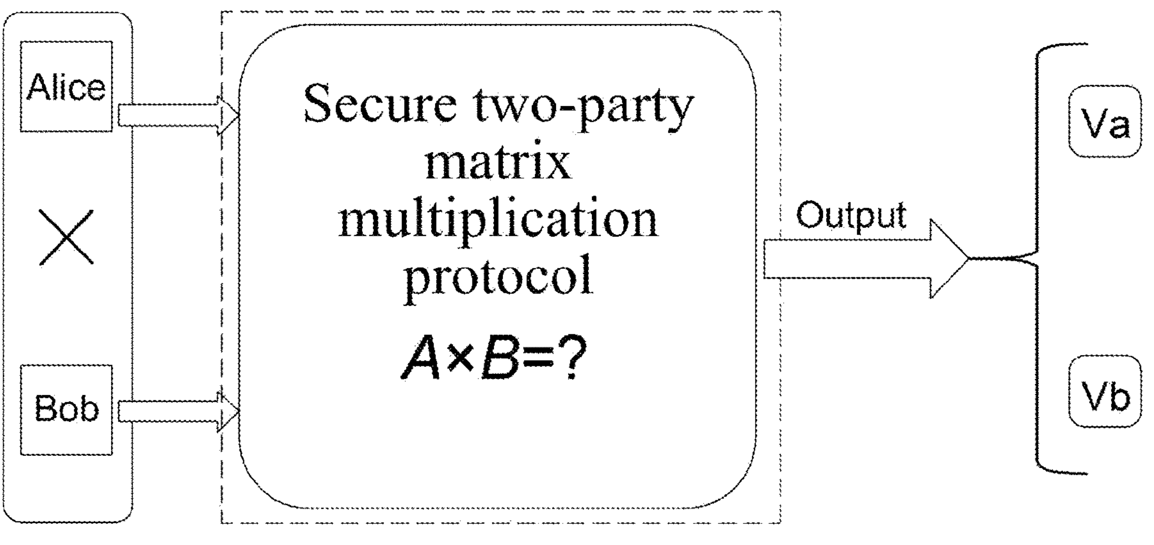
FIG. 2 is a schematic diagram of a secure two-party matrix multiplication problem according to an embodiment of the present disclosure.

1. A secure two-party matrix multiplication problem is defined as follows:

There are two independent participants Alice and Bob who distrust each other. The participant Alice has a private data matrix A whose dimension is n×s and that is stored only on a computing node of Alice. The participant Bob has a private data matrix B whose dimension is s×m. The two participants hope to collaboratively perform a secure matrix multiplication protocol $f(A, B)=AB=V_a+V_b$. Finally, the participants respectively obtain corresponding private output matrices $V_a$, $V_b$ whose dimensions both are n×m, and send the private output matrices to a computation requester for summarization, so as to obtain a two-party matrix multiplication result desired by the participants. In a computation process, each participant can obtain only input and output information of the participant, but cannot obtain an intermediate computation result and data information of another participant. For a formalized description of the problem, refer to FIG. 2.

Figure 3:
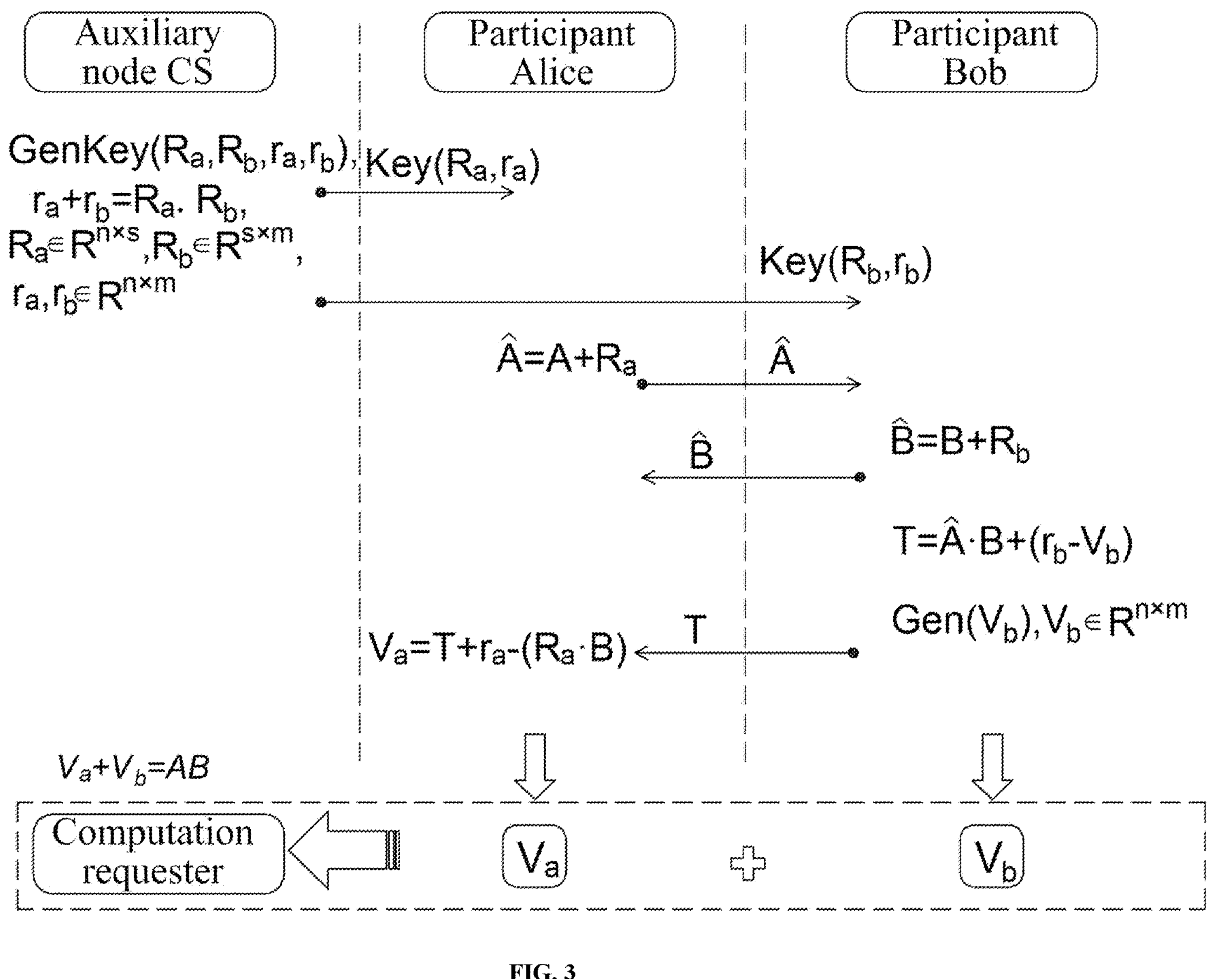
FIG. 3 is a flowchart of a secure two-party matrix multiplication protocol (2PMP) according to an embodiment of the present disclosure.

2. FIG. 3 is a flowchart of the secure two-party matrix multiplication protocol (2PMP), including the following steps.

Step 1: An auxiliary computing node, also referred to as a commodity server CS(CommodityServer) node, generates two random matrix pairs: a random matrix $R_a$ whose dimension is n×s, a random matrix $R_b$ whose dimensions is s×m, and two random matrices $r_a$, $r_b$ whose dimensions both are n×m. These random matrices need to strictly meet a constraint of $r_a+r_b=R_a \cdot R_b$. Then, the CS auxiliary node sends a random matrix pair $(R_a, r_a)$ to a computing node of a participant Alice, and a random matrix pair $(R_b, r_b)$ to a computing node of a participant Bob.

Step 2: After receiving the corresponding random matrix pair $(R_a, r_a)$, the participant Alice computes a confusion matrix $\hat{A}=A+R_a$ inside the node of Alice, and sends the confusion matrix $\hat{A}$ to the participant Bob.

Step 3: After receiving the corresponding random matrix pair $(R_b, r_b)$, the participant Bob computes a confusion matrix $\hat{B}=B+R_b$ inside the node of Bob, and sends the confusion matrix $\hat{B}$ to the participant Alice.

Step 4: After receiving the confusion matrix $\hat{A}$ from the node of the participant Alice, the participant Bob secretly generates a random matrix $V_b \in R^{n \times m}$ internally, secretly computes a private matrix $T=\hat{A} \cdot B+(r_b-V_b)$ locally, and sends the private matrix to the participant Alice.

Step 5: After receiving the private matrix T, the participant Alice secretly computes a random output matrix $V_a=T+r_a-(R_a\cdot\hat{B})$ locally.

Step 6: The participant Bob and the participant Alice send, to a requester of two-party matrix multiplication, corresponding random output matrices $V_a$ and $V_b$ that are finally obtained through obfuscation and splitting and that correspond to Alice and Bob respectively. The requester obtains a final product matrix $AB=V_a+V_b$ through summarization.

Based on the foregoing description, it can be readily verified that:

$$V_a+V_b=\left[\left(\hat{A}\cdot B+(r_b-V_b)\right)+r_a-\left(R_a\cdot\hat{B}\right)\right]+V_b=[(A\cdot B-V_b)+(r_a+r_b-R_a\cdot R_b)]+V_b=A\cdot B.$$

III. Secure Three-Party Matrix Multiplication Protocol (3PMP)

Figure 4:
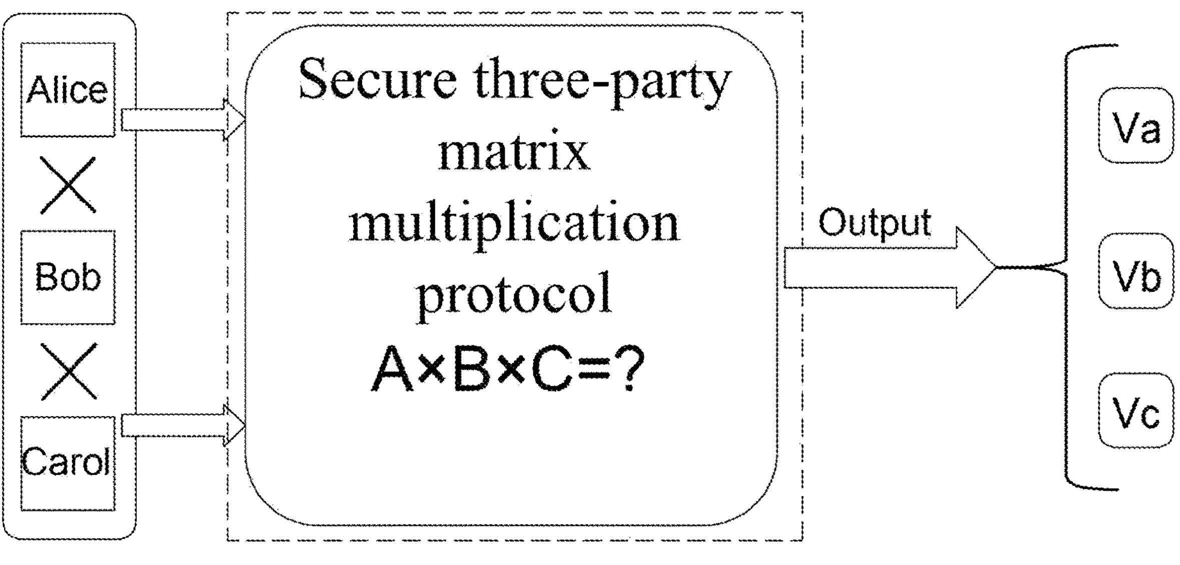
FIG. 4 is a schematic diagram of a secure three-party matrix multiplication problem according to an embodiment of the present disclosure.

1. A secure three-party matrix multiplication problem is defined as follows:

There are three independent participants Alice, Bob, and Carol who distrust each other. The participant Alice has a private data matrix A whose dimension is n×s and that is stored only on a computing node of Alice. The participant Bob has a private data matrix B whose dimension is s×t. The participant Carol has a private data matrix C whose dimension is t×m. The three participants collaboratively perform a three-party matrix multiplication protocol $f(A, B, C)=ABC=V_a+V_b+V_c$. Finally, the participants respectively obtain corresponding private output matrices $V_a$, $V_b$, $V_c$ whose dimensions all are n×m, and send the private output matrices to a computation requester for summarization, so as to obtain a three-party matrix multiplication result desired by the participants. In a computation process, each participant can obtain only input and output information of the participant, but cannot obtain an intermediate computation result and data information of another participant. For details, refer to FIG. 4.

Figure 5:
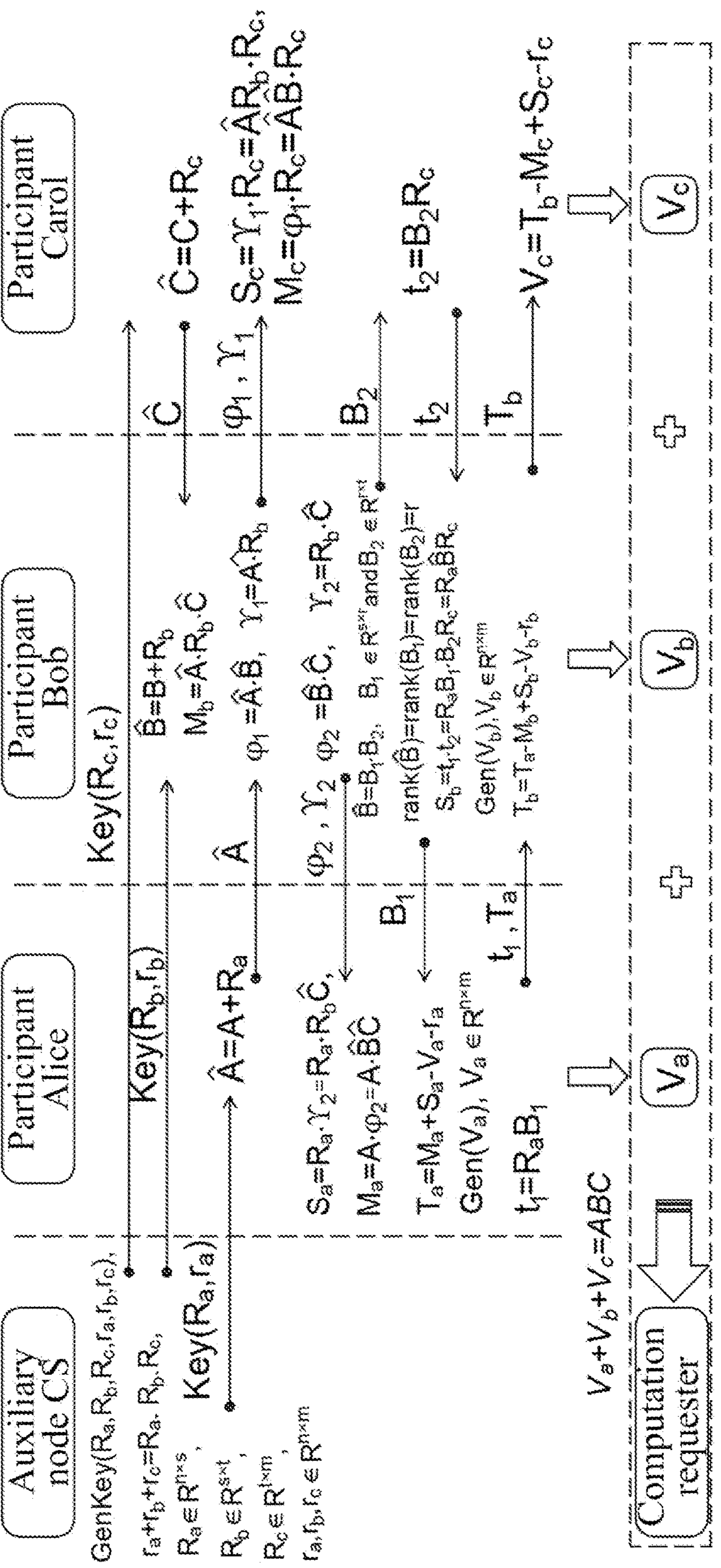
FIG. 5 is a flowchart of a secure three-party matrix multiplication protocol (3PMP) according to an embodiment of the present disclosure.

2. FIG. 5 is a flowchart of the 3PMP protocol, including the following steps.

Step 1: An auxiliary computing node, also referred to as a commodity server CS (Commodity Server) node, generates three random matrix pairs: a random matrix $R_a$ whose dimension is n×s, a random matrix $R_b$ whose dimensions is s×t, a random matrix $R_c$ whose dimensions is t×m, and three random matrices $r_a$, $r_b$, $r_c$ whose dimensions all are n×m. These random matrices need to strictly meet a constraint of $r_a+r_b+r_c=R_a\cdot R_b\cdot R_c$. Then, the CS auxiliary node sends a random matrix pair $(R_a, r_a)$ to a computing node of a participant Alice, a random matrix pair $(R_b, r_b)$ to a computing node of a participant Bob, and a random matrix pair $(R_c, r_c)$ to a computing node of a participant Carol. In an entire execution process of the computing protocol, the CS auxiliary node needs to strictly meet the following three requirements: (1) The CS auxiliary node does not contact private data information related to the participant Alice, Bob, and Carol, regardless of whether an input or output result of an intermediate computation process is involved. (2) The CS auxiliary node does not collude with a computing node of any participant. (3) The CS auxiliary node strictly follows a protocol process to correctly perform an assigned subtask. The CS auxiliary node does not directly participate in an actual computation process subsequent to secure three-party multiplication, but only provides a random matrix pair that is independent of a private data matrix at an initial phase for performing the protocol. This protects private matrix information of a participant, and ensures original data security in a subsequent computation process. Therefore, the CS auxiliary node may generate a large quantity of mutually independent random matrix pairs offline in advance, and send random number seeds to computing nodes of participants Alice, Bob, and Carol in the initial phase for performing a protocol in a manner similar to commodity sale. In this way, a computing node of each participant can obtain corresponding random matrix information, and the commodity server CS gets its name.

Step 2: After receiving the corresponding random matrix pair $(R_a, r_a)$, the participant Alice computes a confusion matrix $\hat{A}=A+R_a$ inside the node of Alice, and sends the confusion matrix to the participant Bob.

Step 3: After receiving the corresponding random matrix pair $(R_c, r_c)$, the participant Carol computes a confusion matrix $\hat{C}=C+R_c$ inside the node of Carol, and sends the confusion matrix to the participant Bob.

Step 4: After receiving the corresponding random matrix pair $(R_b, r_b)$, the participant Bob computes a confusion matrix $\hat{B}=B+R_b$ inside the node of Bob, and synchronously verifies whether the confusion matrix $\hat{B}$ is a non-full-rank matrix. If the confusion matrix is not a non-full-rank matrix, repeat Step 1 to re-select a random matrix pair until a non-full-rank confusion matrix is obtained. Then, the participant Bob continues to compute a matrix $M_b=\hat{A}\cdot R_b\cdot\hat{C}$, sends $\varphi_1=\hat{A}\cdot\hat{B}$ and a random matrix $\gamma_1=\hat{A}\cdot R_b$ to the participant Carol, and sends a random matrix $\varphi_2=\hat{B}\cdot\hat{C}$ and a random matrix $\gamma_2=R_b\cdot\hat{C}$ to the participant Alice.

Step 5: After receiving random matrices $\varphi_2,\gamma_2$ sent by the participant Bob, the participant Alice sequentially computes a matrix $S_a=R_a\cdot\gamma_2=R_a\cdot R_b\hat{C}$ and a matrix $M_a=A\cdot\varphi_2=A\cdot\hat{B}\cdot\hat{C}$.

Step 6: After receiving matrices $\varphi_1,\gamma_1$ sent by the participant Bob, the participant Carol sequentially computes a matrix $S_c=\gamma_1\cdot R_c=\hat{A}R_b\cdot R_c$ and a matrix $M_c=\varphi_1\cdot R_c=\hat{A}\cdot\hat{B}\cdot R_c$.

Step 7: The participant Bob splits the matrix $\hat{B}$ internally through full rank decomposition, so that two submatrices obtained through decomposition are a full-column-rank matrix $B_1\in R^{s\times r}$ and a full-row-rank matrix $B_2\in R^{r\times t}$. Ranks of the non-zero matrix $\hat{B}$ and matrices $B_1,B_2$ obtained through decomposition meet a constraint of $rank(\hat{B})=rank(B_1)=rank(B_2)=r$. The participant Bob sends the matrix $B_1$ to the participant Alice, and sends the matrix $B_2$ to the participant Carol.

Step 8: After receiving the matrix $B_1$ from the participant Bob, the participant Alice secretly generates a random matrix $V_a\in R^{n\times m}$ internally, computes a matrix $T_a=M_a+S_a-V_a-r_a$ and an outcome matrix $t_1=R_aB_1$ locally, and sends the matrix $T_a$ and the outcome matrix $t_1$ to the participant Bob.

Step 9: After receiving the matrix $B_2$ from the participant Bob, the participant Carol secretly computes an outcome matrix $t_2=B_2R_c$, and sends the outcome matrix $t_2$ to the participant Bob.

Step 10: After receiving the matrix $T_a$ and the matrix $t_1$ that are sent by the participant Alice and the outcome matrix $t_2$ sent by the participant Carol, the participant Bob secretly generates a random matrix $V_b\in R^{n\times m}$ internally, secretly computes a matrix $S_b=t_1\cdot t_2=R_aB_1\cdot B_2R_c=R_a\hat{B}R_c$ locally, finally computes a matrix $T_b=T_a-M_b+S_b-V_b-r_b$, and sends the matrix Tb to the participant Carol.

Step 11: After receiving the matrix $T_b$, the participant Carol secretly computes a matrix $V_c=T_b-M_c+S_c-r_c$ locally.

Step 12: The participants Alice, Bob, and Carol send, to a requester of three-party matrix multiplication, corresponding outputs $V_a$, $V_b$, and $V_c$ that are finally obtained through obfuscation and splitting and that correspond to Alice, Bob, and Carol respectively. The requester obtains a final product $ABC=V_a+V_b+V_c$ through summarization.

IV. Secure Multi-Party Data Obfuscation Technique

Figure 6:
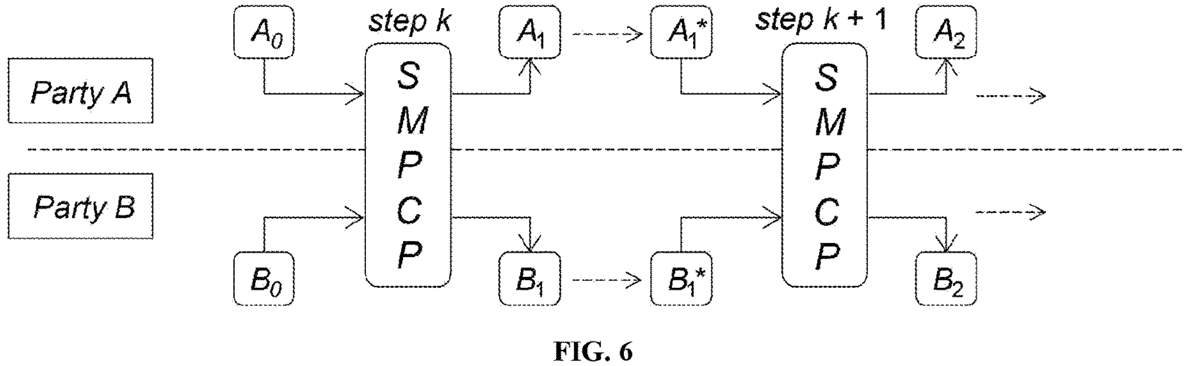
FIG. 6 is a schematic diagram of a secure multi-party data obfuscation technique according to an embodiment of the present disclosure.

In most cases, more than one procedure needs to be performed to ensure secure computation in a multi-party computation process. Therefore, how to ensure safety of an intermediate result is an inevitable problem. For example, a product A×B of two-party matrices is used as an intermediate computation result. In this case, regardless of whether the participant Alice or the participant Bod obtains a result of a final matrix A×B, data information of another party may possibly be deduced reversely. Therefore, not only safety of an original data input but also safety of an intermediate value need to be ensured during a privacy-preserving computation process. In order to solve this problem, a data obfuscation encryption technique is proposed in the present disclosure. To be specific, an arbitrary multi-item operation is split into a new multi-item addition method for obfuscating and computing a result of an intermediate value. To illustrate its principle more easily, a basic two-party operation type is exemplified herein, and its principle is shown in FIG. 6. in FIG. 6, $A_0$, $B_0$ correspond to original private data matrices that belong to a participant Alice and a participant Bob respectively. $A_1$, $B_1$ represent private data matrices that respectively correspond to participants Alice and Bob and that are obtained through a first split performed based on a secure multi-party computing protocol SMPCP. $A_2$, $B_2$ represent private data matrices that correspond to the participants Alice and Bob respectively and that are obtained through a second split performed based on the secure multi-party computing protocol SMPCP. $A^*_1$, $B^*_1$ represent data input by the secure multi-party computing protocol SMPCP for a second time, and indicate updated statuses of the private data matrices $A_1$, $B_1$ output by the secure multi-party computing protocol SMPCP for a first time.

It is assumed that an intermediate result $S_k=F_k(A_i,B_i)$, where $F_k$ represents an objective computation function and corresponds to SMPCP (which generally refers to a secure multi-party computing protocol, Secure Multi-Party Computing Protocol) in the figure. $A_i$ represents private data of the participant Alice, and $B_i$ represents private data of the participant Bob. When each sub protocol of the secure multi-party computing protocol is performed, the intermediate result $S_k$ strictly complies with the following constraint: The participant Alice knows only a computation result $A_k$ of Alice, the participant Bob knows only a computation result $B_k$, and $A_k+B_k=S_k$. A formula $[A_i:B_i]\rightarrow[A_k:B_k|A_k+B_k=F_k(A_i,B_i)]$ represents a transfer process of the intermediate value. In the entire process, the participant Alice and the participant Bob are not allowed to exchange data information between each other, including computation results $A_k$ and $B_k$ that are obtained by splitting the intermediate computation result. If it is ensured that the intermediate value is split into two random data items in each sub protocol during computation, it can be ensured that no participant can reversely deduce an original data item from the obfuscated and encrypted data. In this way, the whole privacy-preserving computation process has high safety.

VI. Secure Three-Party Matrix Hybrid Multiplication Protocol (3PHMP)

A secure three-party matrix hybrid multiplication problem usually appears in a multi-party modeling scenario in which label information is not disclosed and is private data, such as a model that uses multi-party medical and health examination indicator data to implement joint assessment of resident health levels, a model that uses multi-asset and credit data of bank customers to implements customer risk control and evaluation, or a model that uses e-government data from agencies at all levels in smart cities to implement quantitative assessment of a multi-dimensional operational status of a city. This scenario involves a large quantity of intermediate computation processes and various forms of three-party hybrid addition and multiplication. Therefore, as an extension of the foregoing secure two-party matrix hybrid multiplication problem, the secure three-party matrix hybrid multiplication problem is suitable for joint modeling scenarios with higher data security requirements and stronger privacy constraints. Without loss of generality, it is assumed in the protocol that dimensions of initial input matrices of a participant Alice are $A_1\in R^{m\times t}$ and $A_2\in R^{t\times s}$, dimensions of initial input matrices of a participant Bob are $B_1\in R^{m\times t}$ and $B_2\in r^{t\times s}$, and a dimension of an initial input matrix of a participant Carol is $C\in R^{s\times n}$, where s>1. Based on this assumption, the present disclosure designs efficient parallel secure three-party hybrid multiplication protocols with different security levels based on a semi-honest ideal environment and a high-risk environment with data privacy leakage respectively. On the premise that no original data is leaked, these protocols can ensure reliable and secure computation regardless of whether process data or final result data is leaked.

Based on the definition and process description of the foregoing protocol problem, the present disclosure provides two privacy-preserving computation methods for secure three-party matrix hybrid multiplication in different computation environments.

Figure 7:
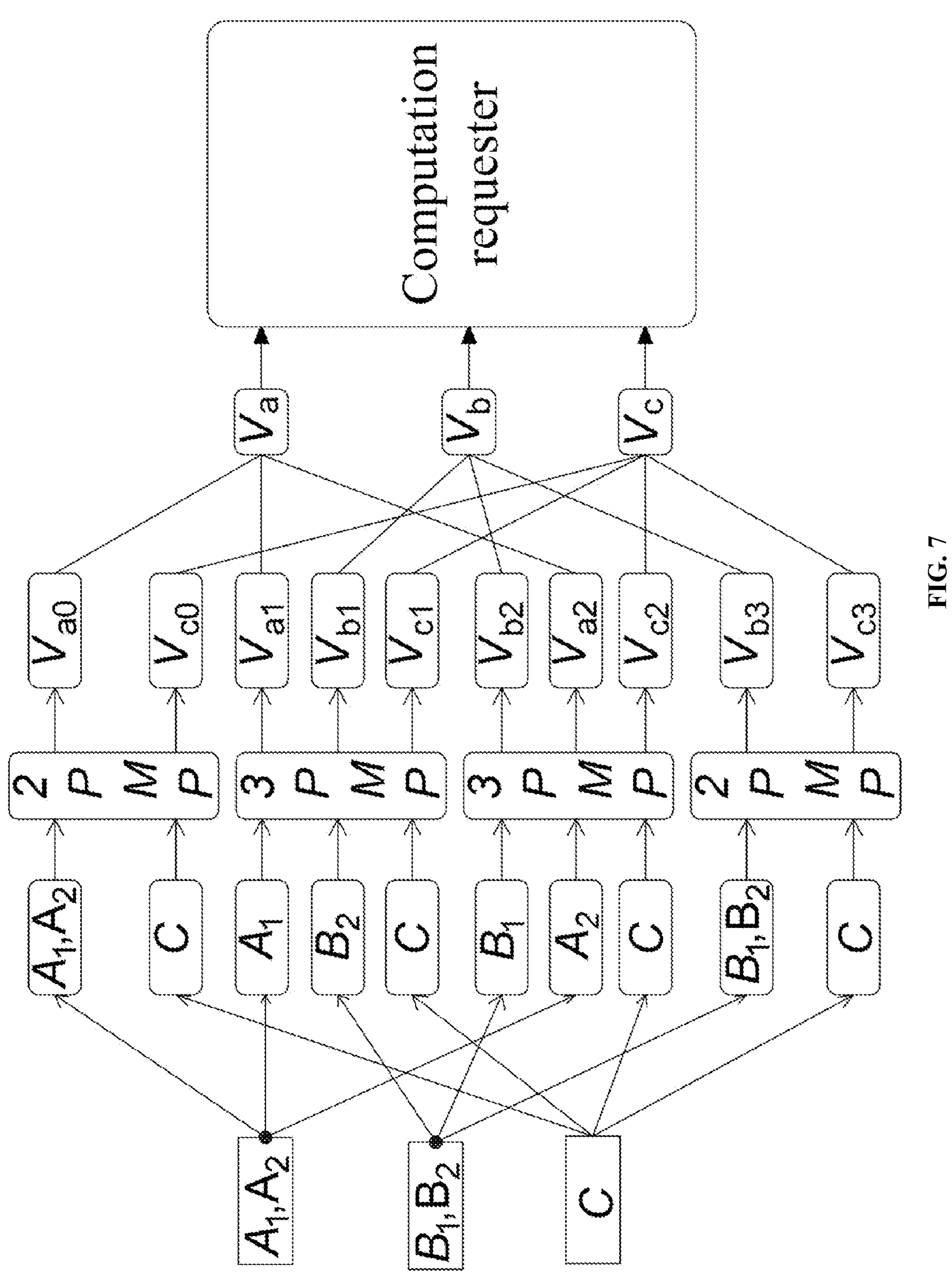
FIG. 7 is a flowchart of a secure three-party matrix hybrid multiplication protocol for a semi-honest environment according to an embodiment of the present disclosure.

(a) Privacy-Preserving Computation Method for Secure Three-Party Matrix Hybrid Multiplication in a Semi-Honest Environment FIG. 7 is a flowchart of a secure three-party matrix hybrid multiplication protocol for a semi-honest environment, including the following steps.

Step 1: A participant Alice performs private matrix multiplication $A^*=A_1\times A_2$ locally and stores, after computation is completed, a private matrix $A^*\in R^{m\times s}$ in a private storage space inside a local node of the participant Alice.

Step 2: Synchronously, a participant Bob performs private matrix multiplication locally in parallel with Step 1 to obtain a private matrix $B^*=B_1\times B_2$ and stores, after computation is completed, the private matrix $B^*\in R^{m\times s}$ in a private storage space inside a local node of the participant Bob.

Step 3: The participant Alice and a participant Carol input, based on a secure two-party matrix multiplication protocol 2PMP, the private matrix $A^*\in R^{m\times s}$ and a private matrix $C\in R^{s\times n}$ respectively, to perform a first round of secure two-party matrix multiplication. After 2PMP protocol computation is completed, an intermediate computation result for this round is randomly split into matrices $V_{a0}$, $V_{c0}\in R^{m\times n}$ by using a random obfuscation technique. Then, the matrices are respectively sent to the participant Alice and the participant Carol, where the two private output matrices satisfy a relationship of $V_{a0}+V_{c0}=A^*\times C$.

Step 4: Synchronously, the participant Bob and the participant Carol input, based on the secure two-party matrix multiplication protocol 2PMP, the private matrix $B^*\in R^{m\times s}$ and the private matrix $C\in R^{s\times n}$ respectively, to perform a second round of secure two-party matrix multiplication in parallel with Step 3. After 2PMP protocol computation is completed, an intermediate computation result for this round is randomly split into matrices $V_{b3}, V_{c3} \in R^{m \times n}$ by using the random obfuscation technique. Then, the matrices are respectively sent to the participant Alice and the participant Bob, where the two private output matrices satisfy a relationship of $V_{b3}+V_{c3}=B^{*} \times C$.

Step 5: Synchronously, the participant Alice, the participant Bob, and the participant Carol input, based on a secure three-party matrix multiplication protocol 3PMP, private matrices $A_1 \in R^{m \times t}$, $B_2 \in R^{t \times s}$, $C \in R^{s \times n}$ respectively, to perform a first round of secure three-party matrix multiplication in parallel with Steps 3 and 4. After 3PMP protocol computation is completed, an intermediate computation result for this round is randomly split into matrices $V_{a1}$, $V_{b1}$, $V_{c1} \in R^{m \times n}$ by using the random obfuscation technique. Then, the matrices are respectively sent to the participant Alice, the participant Bob, and the participant Carol, where the three private output matrices satisfy a relationship of $V_{a1}+V_{b1}+V_{c1}=A_1 \times B_2 \times C$.

Step 6: Synchronously, the participant Alice, the participant Bob, and the participant Carol input, based on the secure three-party matrix multiplication protocol 3PMP, private matrices $A_2 \in R^{t \times s}$, $B_1 \in R^{m \times t}$, $C \in R^{s \times n}$ respectively, to perform a second round of secure three-party matrix multiplication in parallel with Steps 3 to 5. After 3PMP protocol computation is completed, an intermediate computation result for this round is randomly split into matrices $V_{a2}$, $V_{b2}$, $V_{c2} \in R^{m \times n}$ by using the random obfuscation technique. Then, the matrices are respectively sent to the participant Alice, the participant Bob, and the participant Carol, where the three private output matrices satisfy a relationship of $V_{a2}+V_{b2}+V_{c2}=B_1 \times A_2 \times C$.

Step 7: The participant Alice secretly summarizes intermediate random split results $V_{a0}$, $V_{a1}$, $V_{a2}$ generated by the multiplication protocol in the foregoing four rounds that are performed in parallel, and computes a private output matrix $V_a=\Sigma_{0 \le i \le 2}[V_{ai}]=V_{a0}+V_{a1}+V_{a2}$ locally, where $V_a \in R^{m \times n}$.

Step 8: The participant Bob secretly summarizes intermediate random split results $V_{b1}$, $V_{b2}$, $V_{b3}$ generated by the multiplication protocol in the foregoing four rounds that are performed in parallel, and computes a private output matrix $V_b=\Sigma_{1 \le j \le 3}[V_{bj}]=V_{b1}+V_{b2}+V_{b3}$ locally, where $V_b \in R^{m \times n}$.

Step 9: The participant Carol secretly summarizes intermediate random split results $V_{c0}$, $V_{c1}$, $V_{c2}$, $V_{c3}$ generated by the multiplication protocol in the foregoing four rounds that are performed in parallel, and computes a private output matrix $V_c=\Sigma_{0 \le h \le 3}[V_{ch}]=V_{c0}+V_{c1}+V_{c2}+V_{c3}$ locally, where $V_c \in R^{m \times n}$.

Step 10: The participant Alice, the participant Bob, and the participant Carol respectively send, to a requester of secure three-party hybrid multiplication, private matrices $V_a$, $V_b$, $V_c \in R^{m \times n}$ that are finally obtained by summarizing intermediate random obfuscated results. The requester obtains a final computation result $(A_1+B_1) \times (A_2+B_2) \times C=V_a+V_b+V_c$ through summarization. Apparently, it can be readily verified that:

$$
\begin{aligned}
V_a + V_b + V_c &= \sum\nolimits_{0 \le i \le 2} [V_{ai}] + \sum\nolimits_{1 \le j \le 3} [V_{bj}] + \sum\nolimits_{0 \le h \le 3} [V_{ck}] = \\
&(V_{a0} + V_{a1} + V_{a2}) + (V_{b1} + V_{b2} + V_{b3}) + (V_{c0} + V_{c1} + V_{c2} + V_{c3}) = \\
&(V_{a0} + V_{c0}) + (V_{a1} + V_{b1} + V_{c1}) + (V_{a2} + V_{b2} + V_{c2}) + (V_{b3} + V_{c3}) = \\
&(A_1 A_2) \times C + (A_1 \times B_2 \times C) + (B_1 \times A_2 \times C) + B_1 B_2 \big) \times \\
&C = (A_1 + B_1) \times (A_2 + B_2) \times C.
\end{aligned}
$$

Security of the privacy-preserving computation method for secure three-party matrix hybrid multiplication in the semi-honest environment is analyzed and explained below.

The secure three-party matrix hybrid multiplication protocol in a semi-honest environment refers to a process in which three participants Alice, Bob, and Carol perform collaborative computation on the premise that all participant nodes are of a semi-honest type and data does not flow out of a local database. In the semi-honest environment, all participant nodes strictly implement a process in accordance with the protocol. The semi-honest environment is an ideal environment without security risks such as collusion among participants, computing data leakage, and communication packet loss. Therefore, the computing protocol in the semi-honest environment is secure if it is proved that each participant cannot infer, based on local private data information of the participant, private data of another participant.

Further, according to a definition of information theory security, security of a protocol can be analyzed from two perspectives: process-level security and result-level security. For the process-level security, if security of each module involved in intermediate computation processes is ensured, it can be proved that the protocol meets a process-level security requirement, regardless of whether a basic two-party matrix multiplication protocol module, a basic three-party matrix multiplication protocol module, or a secret computation module is invoked during computation. The result-level security of the protocol is analyzed from a global perspective.

Specifically, if any participant node cannot infer original data input information of another participant based on a final output result that can be obtained by performing the protocol, it can be proved that the protocol meets a result-level security requirement. A computing protocol that meets both the process-level security requirement and the result-level security requirement can be considered computationally secure. The following describes security of the secure three-party matrix hybrid multiplication protocol in the semi-honest environment from perspectives of the process-level security and the result-level security.

(1) Process-Level Security

According to the definition of the process-level security and the execution process of the secure three-party matrix hybrid multiplication protocol in this solution, if security of each of Steps 1 to 10 is ensured, it can be proved that the protocol meets the process-level security requirement as a whole. Specifically, for Steps 1 and 2, two-matrix multiplication is performed by a local private computation module, and computation performed inside the nodes does not involve any multi-party data exchange. Therefore, for the participant Alice and the participant Bob, the process-level security of computation in these steps can be ensured. For Step 3, the participant Alice and the participant Bob perform computation based on the secure two-party matrix multiplication protocol 2PMP by strictly following a protocol process. The foregoing research has proven that 2PMP meets the process-level security requirement. Therefore, for semi-honest participants Alice and Bob, the process-level security of computation in this sub-module can be ensured in an environment without a malicious behavior such as data leakage or collusion. For Step 4, which is similar to Step 3, the participant Bob and the participant Carol perform computation based on the secure two-party matrix multiplication protocol 2PMP by strictly following a protocol process. Therefore, for semi-honest participants Bob and Carol, the process-level security of computation in this sub-module can be ensured in an environment without a malicious behavior such as data leakage or collusion. For Steps 5 and 6, the participant Alice, the participant Bob, and the participant Carol perform computation based on the secure three-party matrix multiplication protocol 3PMP by strictly following a protocol process. The foregoing research has proven that 3PMP meets the process-level security requirement. Therefore, for semi-honest participants Alice, Bob, and Carol, the process-level security of computation in this sub-module can be ensured in an environment without a malicious behavior such as data leakage or collusion. For Steps 7 to 9, summarization computation is performed secretly inside each node, and local computation does not involve any data interaction. Therefore, there is no risk of data exposure or collusion, and the process-level security in each private computation module can be ensured.

In conclusion, according to the definition of information theory security, a modular protocol involved in each of the foregoing computation processes can strictly meet the process-level security requirement. Therefore, the entire secure three-party matrix hybrid multiplication protocol also strictly meets the process-level security requirement.

(2) Result-Level Security

On the basis of the definition of the result-level security and output forms of final results in Step 10, it can be learned that: the three participants Alice, Bob, and Carol each ultimately own only a slice matrix of a three-party hybrid multiplication result. According to an incomplete information theory, data information owned by each participant is incomplete. Therefore, any participant can neither infer a final overall computation result nor infer original input data information of another participant based on local information. Therefore, security of a computation result in this solution can be strictly ensured.

Figure 8:
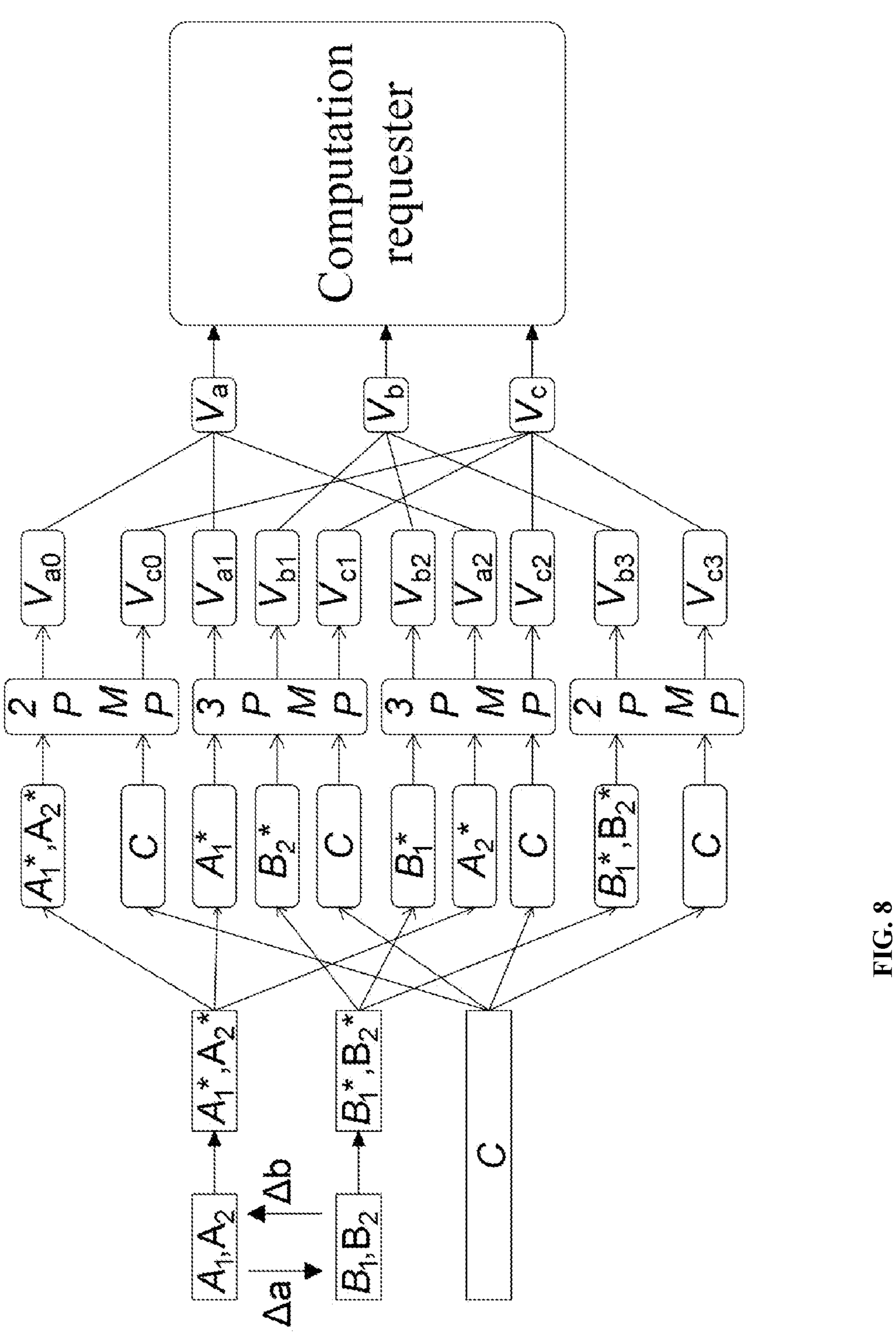
FIG. 8 is a flowchart of a secure three-party matrix hybrid multiplication protocol for a data leakage environment according to an embodiment of the present disclosure.

(b) Privacy-Preserving Computation Method for Secure Three-Party Matrix Hybrid Multiplication in a Scenario with a Data Leakage Risk The solution (a) describes a computing protocol designed based on a semi-honest environment. In this solution, all nodes are semi-honest by default, and perform a computation process in strict accordance with the protocol. There is no collusion or other malicious attacks. Therefore, it is a security computing protocol that is based on an ideal computing environment and can be implemented. However, in an actual scenario, data security is usually threatened by various potential risks, such as data loss caused due to network interruption or congestion, malicious interception and exposure of intermediate computing data, and corruption and collusion between nodes and other malicious behaviors. To prevent these behaviors, the present disclosure designs a secure computing protocol procedure shown in FIG. 8 for a behavioral scenario in which the intermediate computing data is maliciously intercepted and exposed. On this basis, a procedure of a secure three-party matrix hybrid multiplication protocol for a data leakage scenario includes the following steps.

Step 1: A participant Alice secretly splits a private matrix $A_1 \in R^{m\times t}$ into a non-full-column-rank random matrix $A^*_1 \in R^{m\times t}$ and a differential matrix $\Delta_a \in R^{m\times t}$ locally, where $$r(A_1^*) < s,$$

and the private matrix, the random matrix, and the differential matrix satisfy a relationship of $$A_1 = A_1^* + \Delta_a.$$

After computation is completed, Alice sends the differential matrix $\Delta_a$ to a computing node Bob, and stores the matrix $A^*_1$ as a new input matrix in a database of a local node.

Step 2: After receiving the differential matrix $\Delta_a$ sent by the node Alice, the participant node Bob first secretly adds a private matrix $B_1 \in R^{m\times t}$ onto the differential matrix $\Delta_a$ locally to obtain an obfuscated and updated private matrix $$B_1^* \in R^{m\times t},$$

where the private matrix satisfies a relationship of $$B_1^* = B_1 + \Delta_a;$$

and then stores the private matrix $B^*_1$ as a new input matrix in a database of a local node.

Step 3: The participant node Bob secretly splits a private matrix $B_2 \in R^{t\times s}$ into a non-full-row-rank random matrix $B^*_2 \in R^{t\times s}$ and a differential matrix $\Delta_b \in R^{t\times s}$ locally, where $$r(B_2^*) < s,$$

and the private matrix, the random matrix, and the differential matrix satisfy a relationship of $$B_2 = B_2^* + \Delta_b.$$

After computation is completed, the participant Bob sends the differential matrix $\Delta_b$ to the participant Alice, and stores the matrix $B^*_2$ as a new input matrix in the database of the local node.

Step 4: After receiving the differential matrix $\Delta_b$ sent by the participant Bob, the participant Alice first secretly adds a private matrix $A_2 \in R^{t\times s}$ onto the differential matrix $\Delta_b$ locally to obtain an obfuscated and updated private matrix $$A_2^* \in R^{t\times s},$$

where the private matrix satisfies a relationship of $$A_2^* = A_2 + \Delta_b;$$

and then stores the private matrix $A^*_2$ as a new input matrix in the database of the local node.

Step 5: The participant Alice performs private matrix multiplication $$A^* = A_1^* \times A_2^*$$

locally and stores, after computation is completed, a private matrix $A^* \in R^{m\times s}$ in a private storage space inside the local node of the participant Alice.

Step 6: Synchronously, the participant Bob performs private matrix multiplication $B^*=$ $$B_1^* \times B_2^*$$

locally in parallel with Step 5 and stores, after computation is completed, a private matrix $B^* \in R^{m\times s}$ in a private storage space inside the local node of the participant Bob.

Step 7: The participant Alice and a participant Carol input, based on a secure two-party matrix multiplication protocol 2PMP, the private matrix $AA^* \in R^{m\times s}$ and a private matrix $C \in R^{s\times n}$ respectively, to perform a first round of secure two-party matrix multiplication. After 2PMP protocol computation is completed, an intermediate computation result for this round is randomly split into matrices $V_{a0}$, $V_{c0} \in R^{m\times n}$ by using a random obfuscation technique. Then, the matrices are respectively sent to the node Alice and the participant node Carol, where the two private output matrices satisfy a relationship of $$V_{a0} + V_{c0} = A^* \times C = A_1^* A_2^* \times C = M_0.$$

Step 8: Synchronously, the participant Bob and the participant Carol input, based on the secure two-party matrix multiplication protocol 2PMP, the private matrix $B^* \in R^{m\times s}$ and the private matrix $C \in r^{s\times n}$ respectively, to perform a second round of secure two-party matrix multiplication in parallel with Step 7. After 2PMP protocol computation is completed, an intermediate computation result for this round is randomly split into matrices $V_{b3}$, $V_{c3} \in R^{m\times n}$ by using the random obfuscation technique. Then, the matrices are respectively sent to the participant Alice and the participant Bob, where the two private output matrices satisfy a relationship of $$V_{b3} + V_{c3} = B^* \times C = B_1^* B_2^* \times C = M_3.$$

Step 9: Synchronously, the participant Alice, the participant Bob, and the participant Carol input, based on a secure three-party matrix multiplication protocol 3PMP, private matrices $$A_1^* \in R^{m\times t}, B_2^* \in R^{t\times s}, C \in R^{s\times n}$$

respectively, to perform a first round of secure three-party matrix multiplication in parallel with Steps 7 and 8. After 3PMP protocol computation is completed, an intermediate computation result for this round is randomly split into matrices $V_{a1}$, $V_{b1}$, $V_{c1} \in R^{m\times n}$ by using the random obfuscation technique. Then, the matrices are respectively sent to the participant Alice, the participant Bob, and the participant Carol, where the three private output matrices satisfy a relationship of $$V_{a1} + V_{b1} + V_{c1} = A_1^* \times B_2^* \times C = M_1.$$

Step 10: Synchronously, the participant Alice, the participant Bob, and the participant Carol input, based on the secure three-party matrix multiplication protocol 3PMP, private matrices $$A_2^* \in R^{t\times s}, B_1^* \in R^{m\times t}, C \in R^{s\times n}$$

respectively, to perform a fourth round of secure three-party matrix multiplication in parallel with Steps 7 to 9. After 3PMP protocol computation is completed, an intermediate computation result for this round is randomly split into matrices $V_{a2}$, $V_{b2}$, $V_{c2} \in R^{m\times n}$ by using the random obfuscation technique. Then, the matrices are respectively sent to the participant Alice, the participant Bob, and the participant Carol, where the three private output matrices satisfy a relationship of $$V_{a2} + V_{b2} + V_{c2} = B_1^* \times A_2^* \times C = M_2.$$

Step 11: The participant Alice secretly summarizes intermediate random split results $V_{a0}$, $V_{a1}$, $V_{a2}$ generated by the multiplication protocol in the foregoing four rounds that are performed in parallel, and performs private computation $V_a=\Sigma_{0\le i\le 2}[V_{ai}]=V_{a0}+V_{a1}+V_{a2}$ locally, where $V_a \in R^{m\times n}$.

Step 12: The participant Bob secretly summarizes intermediate random split results $V_{b1}$, $V_{b2}$, $V_{b3}$ generated by the multiplication protocol in the foregoing four rounds that are performed in parallel, and performs private computation $V_b=\Sigma_{1\le j\le 3}[v_{bj}]=V_{b1}+V_{b2}+V_{b3}$ locally, where $V_b \in R^{m\times n}$.

Step 13: The participant Carol secretly summarizes intermediate random split results $V_{c0}$, $V_{c1}$, $V_{c2}$, $V_{c3}$ generated by the multiplication protocol in the foregoing four rounds that are performed in parallel, and performs private computation $V_c=\Sigma_{0\le h\le 3}[V_{ch}]=V_{c0}+V_{c1}+V_{c2}+V_{c3}$ locally, where $V_c \in R^{m\times n}$.

Step 14: The participant Alice, the participant Bob, and the participant Carol respectively send, to a requester of secure three-party hybrid multiplication, private matrices $V_a$, $V_b$, $V_c \in R^{m\times n}$ that are finally obtained by summarizing intermediate random obfuscated results. The requester obtains a final computation result $(A_1+B_1)\times(A_2+B_2)\times C=V_a+V_b+V_c$ through summarization. Apparently, it can be readily verified that:

$$\begin{aligned} V_a + V_b + V_c = \sum\nolimits_{0\le i\le 2}[V_{ai}] + \sum\nolimits_{1\le j\le 3}[V_{bj}] + \sum\nolimits_{0\le h\le 3}[V_{ck}] = \\ (V_{a0} + V_{a1} + V_{a2}) + (V_{b1} + V_{b2} + V_{b3}) + (V_{c0} + V_{c1} + V_{c2} + V_{c3}) = \\ (V_{a0} + V_{c0}) + (V_{a1} + V_{b1} + V_{c1}) + (V_{a2} + V_{b2} + V_{c2}) + (V_{b3} + V_{c3}) = \\ (A_1^* A_2^*) \times C + (A_1^* \times B_2^* \times C) + (B_1^* \times A_2^* \times C) + (B_1^* B_2^*) \times C = \\ (A_1^* + B_1^*) \times (A_2^* + B_2^*) \times (A_1 + B_1) \times (A_2 + B_2) \times C. \end{aligned}$$

Security of the privacy-preserving computation method for secure three-party matrix hybrid multiplication in the scenario with a privacy leakage risk is analyzed and explained below.

It is very difficult to provide a completely semi-honest computing environment in an actual application scenario. Therefore, it is difficult to achieve full balance and trust in terms of network environment security, communication network stability, or trustworthiness among participant computing nodes. Therefore, the solution (b) is specifically designed for a model in a data leakage scenario, so that the protocol strictly meets process-level and result-level security requirements in the data leakage scenario.

Considering a cause of data privacy leakage in a computing environment, only an intermediate result generated in a computation process or a computation result that is finally output may probably be leaked because participants are semi-honest and do not disclose information to each other. Leakage of original data privacy caused due to leakage of a computation result slice fundamentally stems from a data structure of an input matrix, which is inevitable for any secure computing protocol. For example, for a basic secure two-party matrix multiplication protocol 2PMP module invoked in Step 7 in an intermediate process of the computing protocol in FIG. 8, if an input data matrix is full-rank and either of the final computation results $V_{a0}$ and $V_{c0}$ is leaked, a final computation result $M_0$ of two-party matrix multiplication in this sub protocol is definitely leaked, regardless of which manner is used to implement the secure computation process. Specifically, it is assumed that original data matrices of the participant Alice and the participant Carol are both non-singular square matrices. In this case, because data structures of input matrices are full-rank, the participant Alice may directly infer an input matrix Carol of the participant C based on a private matrix of Alice and an involved matrix equation $M_0=AX$, or Carol may infer an input matrix A of the participant Alice based on a matrix equation $M_0=XC$. With reference to the foregoing causes of security risks in a data leakage environment and the computation process of the solution (b), major involved modules are the four parallel secure computation modules (2PMP, 3PMP, 3PMP, and 2PMP) shown in FIG. 8 in the solution (b). Therefore, if security of the four core modules is ensured in a data leakage scenario, the protocol can effectively resist against a data leakage risk from a global perspective. For details, refer to a diagram, shown in FIG. 9, of security status analysis for the four modules. The following describes security of the secure three-party hybrid multiplication protocol in the scenario with a privacy leakage risk from perspectives of process-level security and result-level security.

(1) Process-Level Security

For Steps 1 to 4 in this solution, the participants Alice and Bob secretly split their own private data matrices $A_1 \in R^{m\times t}$ and $B_2 \in R^{m\times t}$ respectively into non-full-rank matrices $$A_1^* \in R^{m\times t} \text{ and } B_2^* \in R^{t\times s},$$

and obtains random matrices $B^*_1 \in R^{m\times t}$, $A^*_2 \in R^{t\times s}$ by performing addition on the differential matrices $\Delta_a \in R^{m\times t}$, $\Delta_b \in R^{t\times s}$ respectively. The foregoing splitting process and obfuscation addition process are performed locally. In addition, neither the participant Alice nor the participant Bob can obtain any information about an original input matrix related to the other participant based on an obtained differential matrix. Therefore, the foregoing data obfuscation splitting module strictly meets a process-level security requirement.

For Steps 5 and 6, private matrix multiplication is performed inside a node of each participant. Therefore, similarly, the process-level security requirement can be strictly met because there is no collusion between any two participants and no data interaction. For the four secure matrix multiplication modules in Steps 7 to 10, because the foregoing researches have proven that the basic protocols 2PMP and 3PMP can both meet the process-level security requirement, computation modules corresponding to the four steps strictly meet the process-level security requirement on the premise that no collusion occurs. For Steps 11 to 13, slice matrices obtained through random splitting are secretly summarized inside corresponding participant nodes. Therefore, the process-level security requirement can be strictly met on the premise that there is no collusion between nodes and no data interaction.

In conclusion, according to a definition of information theory security, if a modular protocol involved in each of the foregoing computation processes can strictly meet the process-level security requirement, the entire secure three-party matrix hybrid multiplication protocol also strictly meets the process-level security requirement.

(2) Result-Level Security

This solution is based on the secure three-party hybrid multiplication protocol that is for a data leakage environment. Therefore, it is necessary to perform security analysis on a result slice matrix critical to privacy leakage of the protocol. As mentioned in the foregoing security analysis of this solution, leakage of original data privacy caused due to leakage of a result slice fundamentally stems from a data structure related to a rank of an input matrix. Leakage of an intermediate result does not directly expose original data. Instead, a participant needs to infer original data information of another participant based on a leaked slice matrix and a related matrix equation. Therefore, it is necessary to perform data exposure security analysis on final output slice matrices $V_a$, $V_b$, $V_c$ in Steps 11-13 of the protocol. In addition, it is necessary to take into account s security impact caused by leakage of 10 result slice matrices $V_{a0}$, $V_{a1}$, $V_{a2}$, $V_{b1}$, $V_{b2}$, $V_{b3}$, $V_{c0}$, $V_{c1}$, $V_{c2}$, $V_{c3}$ obtained in Step 13 by a total of four two-party and three-party security matrix multiplication (2PMP or 3PMP) modules.

First, for a module 1 (that is, a first 2PMP), when the result slice matrix $V_{a0}$ is leaked, the participant Carol can at most obtain $$X = A_1^* A_2^*$$

in a matrix equation $XC=M_0$ based on $V_{a0}+V_{c0}=M_0$ and the matrix C, but cannot obtain information of a specific input matrix $$A_1^* \text{ or } A_2^*.$$

In addition, due to incomplete information, the participant Carol does not know information about the differential matrices $\Delta_a$ and $\Delta_b$, and therefore cannot know information about original input matrices $$A_1 = A_1^* + \Delta_a \text{ and } A_2 = A_2^* - \Delta_b.$$

It is assumed that the result slice matrix $V_{c0}$ is leaked. In this case, after split conversion is performed on the input matrix $$A^* = A_1^* A_2^*$$

of the participant Alice, the non-full-column-rank matrix $$A_1^*$$

satisfies $$r(A_1^*) < t.$$

According to a rank inequality theorem $$r(A_1^* \times A_2^*) \leq \min\{r(A_1^*), r(A_2^*)\} \leq s$$

for matrix multiplication, the input matrix A* is definitely a non-full-column-rank matrix. Therefore, there are infinite solutions to a matrix equation $AX=M_0$, and the participant Alice cannot infer a specific true value of the input matrix C of the participant Carol. Similarly, a module 4 (that is, a second 2PMP) is also implemented based on the secure two-party matrix multiplication protocol. In this case, when the result slice matrix $V_{b3}$ is leaked, the participant node Carol can at most obtain $$X = B_1^* B_2^*$$

in a matrix equation $XC=M_3$ based on $V_{b3}+V_{c3}=M_3$ and the matrix C, but cannot obtain information of a specific input matrix $$B_1^* \text{ or } B_2^*.$$

In addition, due to incomplete information, the participant Carol does not know information about the differential matrices $\Delta_a$ and $\Delta_b$, and therefore cannot know information about original input matrices $$B_2 = B_2^* + \Delta_b \text{ and } B_1 = B_1^* - \Delta_a.$$

It is assumed that the result slice matrix $V_{c3}$ is leaked. In this case, after split conversion is performed on the input matrix $$B^* = B_1^* B_2^*$$

of the participant Bob, the non-full-rank matrix $$B_2^*$$

satisfies $$r(B_2^*) < s.$$

According to a rank inequality theorem $$r(B_1^* \times B_2^*) \leq \min\{r(B_1^*), r(B_2^*)\} \leq s$$

for matrix multiplication, the input matrix B* is definitely a non-full-row-rank matrix. Therefore, there are infinite solutions to a matrix equation $BX=M_3$, and the participant Bob cannot infer a specific true value of the input matrix C of the node Carol.

For a module 2 (that is, a first 3PMP), three result slice matrices $V_{a1}$, $V_{b1}$, $V_{c1}$ are output based on the 3PMP. If any of the three slice matrices is leaked, other participants cannot infer, based on the leaked slice matrix and slice matrices of the participants, original data of a participant whose data is leaked. This is because a result $M_1=V_{a1}+V_{b1}+V_{c1}$ of three-party matrix multiplication can be fully recovered only if all the three result slice matrices $V_{a1}$, $V_{b1}$, and $V_{c1}$ are obtained. Therefore, if any one of result slice matrices is leaked, no privacy leakage risk can be caused to original input data matrices $$A_1^*, B_2^*, C$$

of the module 2. A computing protocol procedure of a module 3 (that is, a second 3PMP) and that of the module 2 are implemented based on the secure three-party matrix multiplication protocol 3PMP. Therefore, if any of the three result slice matrices $V_{a2}$, $V_{b2}$, $V_{c2}$ output by the module 3 is leaked, other participants cannot infer, based on the leaked slice matrix and slice matrices of the participants, original data of a participant whose data is leaked.

For the result slice matrices $V_a$, $V_b$, $V_c$ that are finally output, a final secure three-party hybrid multiplication result is $(A_1+B_1)\times(A_2+B_2)\times C=V_a+V_b+V_c$, and therefore a security analysis of this solution is similar to security analysis of the three-party matrix hybrid multiplication protocol in the solution (a). If any of the three slice matrices is leaked, other participants cannot infer, based on the leaked slice matrix and slice matrices of the participants, original data of a participant whose data is leaked. This is because a final result $M=V_a+V_b+V_c$ of three-party hybrid matrix multiplication can be fully recovered only if all the three result slice matrices $V_a$, $V_b$, $V_c$ are obtained. Therefore, if any one of the result slice matrices is leaked, no privacy leakage risk can be caused to initial input matrices $A_1$, $B_1$, $A_2$, $B_2$, C of the protocol.

In conclusion, regardless of whether local leakage of an output result of each sub-module or global leakage of an output result is concerned, the solution (b) can effectively protect privacy security of original input data involved in computation, so that secure three-party matrix hybrid multiplication can be performed safely and stably. In other words, for the entire secure three-party matrix hybrid multiplication protocol, the solution (b) strictly meets the result-level security requirement.

Compared with the prior art, the present disclosure has the following advantages:

(1) The present disclosure proposes two end-to-end parallel three-party hybrid multiplication solutions for a semi-honest environment and a result leakage environment based on the secure two-party matrix multiplication protocol 2PMP and the secure three-party matrix multiplication protocol 3PMP. This solves prior-art problems of high communication overheads and a large ciphertext computation space that are caused due to use of homomorphic encryption and oblivious transfer technologies.

(2) The present disclosure uses differential matrices to implement addition decomposition with a controllable matrix rank. This solves a prior-art problem that a security risk exists in two-matrix multiplication if an input matrix is full-rank.

(3) The secure two-party matrix multiplication protocol (2PMP) and the secure three-party matrix multiplication protocol (3PMP) provided in the present disclosure implement a hybrid multiplication solution in a four-link parallel computing mode, and solve a prior-art problem that data result leakage causes a potential risk to original data privacy.

(4) The secure two-party matrix multiplication protocol and the secure three-party matrix multiplication protocol that support computation with precision up to a 64-bit floating number are used in the present disclosure. This solves a prior-art problem that numerical precision of floating point computation is inadequate because a quantity of ciphertext digits is fixed.

Figure 10:
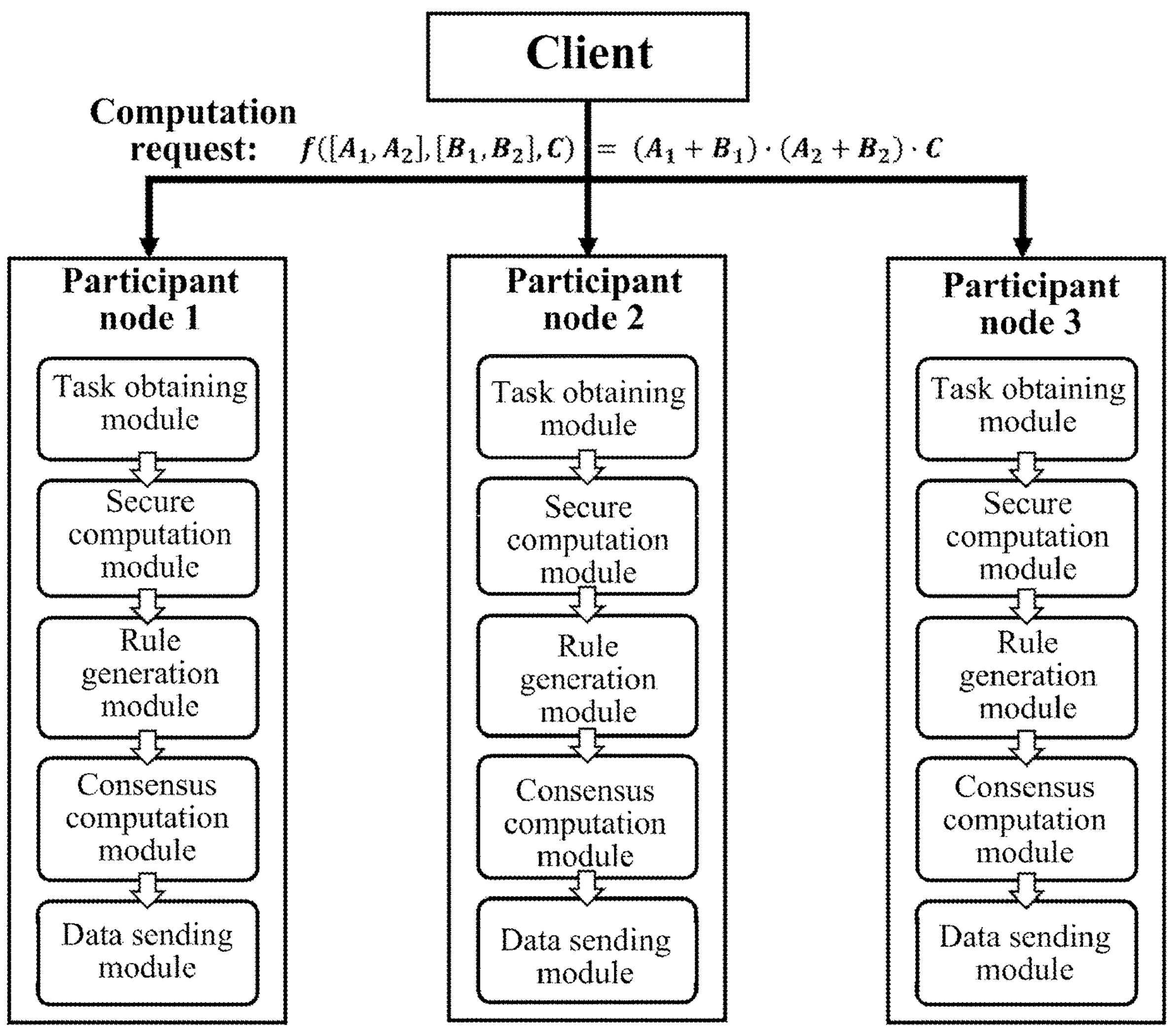
FIG. 10 is a schematic diagram of an apparatus for implementing secure three-party matrix hybrid multiplication applied to a computing node according to an embodiment of the present disclosure.

Further, in order to better represent the technical process of the present disclosure, a privacy-preserving computation apparatus for secure three-party matrix hybrid multiplication is provided, as shown in FIG. 10. Execution process of the apparatus is as follows:

First, a corresponding distributed computing framework needs to be deployed at a computation participant node participating in a secure three-party matrix hybrid multiplication task. The framework consists of five modules, including a task obtaining module, a secure computation module, a rule generation module, a consensus computation module, and a data sending module. The task obtaining module is responsible for receiving and decoding a privacy-preserving computation request from a client. The secure computation module automatically matches a corresponding secure three-party computing protocol based on a decoded computation request. The rule generation module splits a computation task based on an asynchronous instruction set of the secure computing protocol, so that different computing nodes perform collaborative computation based on sub-rules corresponding to the computing nodes. After receiving an assigned sub-rule, the consensus computation module ensures computation synchronization and result consistency through a consensus protocol. After computation is completed, the data sending module collects and transmits computation results of participant nodes to a computation requester.

Based on the foregoing structure, a specific implementation of the apparatus is as follows:

An external client sends a three-party original matrix hybrid multiplication request to a network terminal deployed with a distributed computation service through a hypertext transfer protocol (HTTP) or Google remote procedure call (GRPC) communication protocol. When a task obtaining module of a node of a network receives a matrix hybrid multiplication request (Request), the task obtaining module parses the request and starts security computation service processes corresponding to computation participant nodes 1, 2, and 3. After the task obtaining module parses a corresponding computation requirement, the task obtaining module transmits a result to the secure computation module, performs a joint query through an internal interface of the task obtaining module, and synchronizes the result to the rule generation module of each of the three participant nodes after matching a corresponding secure computing protocol. The rule generation module makes different asynchronous parallel execution flows based on different subtasks assumed by three different participant nodes, and maintains communication with the consensus computation module at each step of execution. The consensus computation module broadcasts and maintains result consistency among distributed computing nodes on a chain and controls stability of an execution process while the three participant nodes perform each computation instruction. After a final computing protocol is performed, and the three participant nodes obtain computation sub-results of each other, the three participant nodes each send, the computation requester by using the data sending module, sub-matrices obtained through three-party obfuscation splitting, so as to obtain a correct computation result.

Based on the foregoing description, the present disclosure proposes two end-to-end parallel hybrid multiplication solutions for a semi-honest environment and a result leakage environment based on the basic secure two-party matrix multiplication protocol. This solves prior-art problems of high communication overheads and a large ciphertext computation space that are caused due to use of homomorphic encryption and oblivious transfer technologies, and implements a four-link parallel secure two-party matrix hybrid multiplication solution that is independent on a third-party cloud service provider.

The present disclosure proposes a data obfuscation method for single-matrix rank reduction based on differential matrix reconciliation, which essentially solves a prior-art problem that ranks of some special full-rank input matrices affect computation result security.

The secure two-party matrix multiplication protocol and the secure three-party matrix multiplication protocol are used in the present disclosure, which implements a hybrid multiplication solution in four-link parallel computing mode, and solves a prior-art problem that data result leakage causes a potential risk to original data privacy.

Based on a random obfuscation encryption concept with reference to the high-precision 2PMP and 3PMP, the present disclosure constructs two secure three-party hybrid multiplication protocols for different scenarios. The 2PMP and 3PMP can support precision up to a 64-bit floating point. Therefore, the protocols are not limited to integer-type matrix computation. Compared with obfuscation circuit and homomorphic encryption solutions that can be used to process only fixed-length decimals and integers, secure matrix multiplication is applicable to more scenarios. In addition, numerical computation precision of a computation result obtained through secure matrix multiplication is at a same order of magnitude as that of a computation result obtained by using a centralized computing method.

In addition, the secure two-party matrix multiplication protocol and the secure three-party matrix multiplication protocol provided in solutions (a) and (b) may alternatively be replaced by an existing cryptography tool such as secret sharing, oblivious transfer, an obfuscation circuit, or fully homomorphic encryption.

Each embodiment in the description is described in a progressive mode, each embodiment focuses on differences from other embodiments, and references can be made to each other for the same and similar parts between embodiments.

Particular examples are used herein for illustration of principles and implementations of the present disclosure. The descriptions of the above embodiments are merely used for assisting in understanding the method of the present disclosure and its core ideas. In addition, those of ordinary skill in the art can make various modifications in terms of particular implementations and the scope of application in accordance with the ideas of the present disclosure. In conclusion, the content of the description shall not be construed as limitations to the present disclosure.

What is claimed is:

1. A privacy-preserving computation method for secure three-party matrix hybrid multiplication applied in a joint assessment of resident health levels, the method being executed in a privacy-preserving computation system for secure three-party matrix hybrid multiplication comprising a client and three participant nodes serving as computing devices and comprising a first participant node, a second participant node and a third participant node, wherein the privacy-preserving computation method comprises:

by the client, generating a privacy-preserving computation request related to multi-party medical and health examination indicator data; and by each of the three participant nodes, constructing a secure two-party matrix multiplication protocol and a secure three-party matrix multiplication protocol;

obtaining the privacy-preserving computation request, and decoding the privacy-preserving computation request to obtain a decoded privacy-preserving computation request; and matching the secure two-party matrix multiplication protocol or the secure three-party matrix multiplication protocol based on the decoded privacy-preserving computation request, to complete privacy-preserving computation of each participant node;

wherein each of the three participant nodes exchanges data with the client and the client is further configured to collect privacy-preserving computation results of the three participant nodes;

wherein in a semi-honest computation environment, the matching the secure two-party matrix multiplication protocol or the secure three-party matrix multiplication protocol based on the decoded privacy-preserving computation request, to complete privacy-preserving computation of each participant node comprises:

performing, by the first participant node, private matrix multiplication locally; and storing, in a private storage space inside the first participant node after computation is completed, a first private matrix obtained through computation;

performing, by the second participant node, computation the same as that performed by the first participant node, to obtain a second private matrix; and storing, after the computation is completed, the second private matrix in a private storage space inside the second participant node;

inputting, by the first participant node and the third participant node, private matrices of the first participant node and the third participant node respectively based on the secure two-party matrix multiplication protocol, to perform a first round of secure two-party matrix multiplication to obtain a private output matrix of the first participant node and a private output matrix of the third participant node;

inputting, by the second participant node and the third participant node, private matrices of the second participant node and the third participant node respectively based on the secure two-party matrix multiplication protocol, to perform a second round of secure two-party matrix multiplication to obtain a private output matrix of the second participant node and a private output matrix of the third participant node;

inputting, by the first participant node, the second participant node, and the third participant node, private matrices of the first participant node, the second participant node, and the third participant node respectively based on the secure three-party matrix multiplication protocol, to perform a first round of secure three-party matrix multiplication to obtain a private output matrix of the first participant node, a private output matrix of the second participant node, and a private output matrix of the third participant node;

inputting, by the first participant node, the second participant node, and the third participant node, private matrices of the first participant node, the second participant node, and the third participant node respectively based on the secure three-party matrix multiplication protocol, to perform a second round of secure three-party matrix multiplication to obtain a private output matrix of the first participant node, a private output matrix of the second participant node, and a private output matrix of the third participant node;

secretly summarizing, by the first participant node, generated intermediate random split results, and computing a first private output matrix locally;

secretly summarizing, by the second participant node, generated intermediate random split results, and computing a second private output matrix locally;

secretly summarizing, by the third participant node, generated intermediate random split results, and computing a third private output matrix locally;

sending, by the first participant node, the second participant node, and the third participant node, the first private output matrix, the second private output matrix, and the third private output matrix respectively to the client of secure three-party hybrid multiplication, wherein the client obtains a final computation result through summarization; and implementing, by the client, the joint assessment of resident health levels based on the final computation result.

2. The privacy-preserving computation method for secure three-party matrix hybrid multiplication according to claim 1, wherein the secure two-party matrix multiplication protocol specifies that: participant nodes each have a corresponding private input matrix; and after collaboratively performing a two-party multiplication protocol, the participant nodes each obtain an output corresponding to the participant node, wherein the output satisfies a formula of $v_1+v_2=x \cdot y$, wherein the two-party multiplication protocol is expressed as follows:

$f(x_1,y_1)=\text{Output }(v_1,v_2)=x_1 \cdot y_1$, wherein $x_1$ represents a private input matrix of the first participant node, $y_1$ represents a private input matrix of the second participant node, $v_1$ represents an output of the first participant node, $v_2$ represents an output of the second participant node, and $f(x_1,y_1)$ represents a function value of the two-party multiplication protocol.

3. The privacy-preserving computation method for secure three-party matrix hybrid multiplication according to claim 1, wherein the secure three-party matrix multiplication protocol specifies that: participant nodes each have a corresponding private input matrix; and after collaboratively performing a three-party hybrid multiplication protocol, the participant nodes each obtain an output corresponding to the participant node, wherein the output satisfies a formula of $v_1+v_2+v_3=(x_1+y_1)\cdot(x_2+y_2)\cdot z$, wherein the three-party hybrid multiplication protocol is expressed as follows:

$f(x_1,X_2), (y_1,y_2),z)=Output(v_1,v_2,v_3)=(x_1+y_1)\cdot(x_2+y_2)\cdot z$, wherein $(x_1,x_2)$ represents a private input matrix of the first participant node, $(y_1,y_2)$ represents a private input matrix of the second participant node, z represents a private input matrix of the third participant node, $v_1$ represents an output of the first participant node, $v_2$ represents an output of the second participant node, $v_3$ represents an output of the third participant node, and $f((x_1,x_2), (y_1,y_2)z)$ represents a function value of the three-party hybrid multiplication protocol.

4. The privacy-preserving computation method for secure three-party matrix hybrid multiplication according to claim 1, wherein during the first round of secure two-party matrix multiplication, the private output matrix of the first participant node and the private output matrix of the third participant node satisfy a relationship of $V_{a0}+V_{e0}=A^*\times C$;

during the second round of secure two-party matrix multiplication, the private output matrix of the second participant node and the private output matrix of the third participant node satisfy a relationship of $V_{b3}+V_{c3}=B^*\times C$;

during the first round of secure three-party matrix multiplication, the private output matrix of the first participant node, the private output matrix of the second participant node, and the private output matrix of the third participant node satisfy a relationship of $V_{a1}+V_{b1}+V_{c1}=A_1\times B_2\times C$; and during the second round of secure three-party matrix multiplication, the private output matrix of the first participant node, the private output matrix of the second participant node, and the private output matrix of the third participant node satisfy a relationship of $V_{a2}+V_{b2}+V_{c3}=B_1\times A_2\times C$, wherein $V_{a0}$ represents a first intermediate random split result of the first participant node, $V_{c0}$ represents a first intermediate random split result of the third participant node, A* represents the first private matrix, C represents a private matrix of the third participant node, $V_{b3}$ represents a third intermediate random split result of the second participant node, $V_{c3}$ represents a fourth intermediate random split result of the third participant node, B* represents the second private matrix, $V_{a1}$ represents a second intermediate random split result of the first participant node, $V_{b1}$ represents a first intermediate random split result of the second participant node, $V_{c1}$ represents a second intermediate random split result of the third participant node, $A_1$ represents a first private matrix of the first participant node, $B_2$ represents a second private matrix of the second participant node, $V_{a2}$ represents a third intermediate random split result of the first participant node, $V_{b2}$ represents a second intermediate random split result of the second participant node, $V_{c2}$ represents a third intermediate random split result of the third participant node, $B_1$ represents a first private matrix of the second participant node, and $A_2$ represents a second private matrix of the first participant node.

5. A privacy-preserving computation method for secure three-party matrix hybrid multiplication applied in a joint assessment of resident health levels, the method being executed in a privacy-preserving computation system for secure three-party matrix hybrid multiplication comprising a client and three participant nodes serving as computing devices and comprising a first participant node, a second participant node and a third participant node, wherein the privacy-preserving computation method comprises:

by the client, generating a privacy-preserving computation request related to multi-party medical and health examination indicator data; and by each of the three participant nodes, constructing a secure two-party matrix multiplication protocol and a secure three-party matrix multiplication protocol;

obtaining the privacy-preserving computation request, and decoding the privacy-preserving computation request to obtain a decoded privacy-preserving computation request; and matching the secure two-party matrix multiplication protocol or the secure three-party matrix multiplication protocol based on the decoded privacy-preserving computation request, to complete privacy-preserving computation of each participant node;

wherein each of the three participant nodes exchanges data with the client, and the client is further configured to collect privacy-preserving computation results of the three participant nodes;

wherein in a scenario with a privacy leakage risk, the matching the secure two-party matrix multiplication protocol or the secure three-party matrix multiplication protocol based on the decoded privacy-preserving computation request, to complete privacy-preserving computation of each participant node comprises:

secretly splitting, by the first participant node, a first private matrix into a non-full-column-rank random matrix and a differential matrix locally, sending the differential matrix to the second participant node, and storing the random matrix as a new input matrix in a database of the first participant node;

secretly adding, by the second participant node after receiving the differential matrix sent by the first participant node, a first private matrix of the second participant node onto the received differential matrix to obtain a first obfuscated and updated private matrix, and storing the first obfuscated and updated private matrix as a new input matrix in a database of the second participant node;

secretly splitting, by the second participant node, a second private matrix of the second participant node into a non-full-row-rank random matrix and a differential matrix locally; sending, to the first participant node, the differential matrix obtained through splitting; and storing the non-full-row-rank random matrix as a new input matrix in the database of the second participant node;

secretly adding, by the first participant node after receiving the differential matrix sent by the second participant node, a second private matrix of the first participant node onto the received differential matrix to obtain a second obfuscated and updated private matrix, and storing the second obfuscated and updated private matrix as a new input matrix in the database of the first participant node;

performing, by the first participant node, private matrix multiplication based on the second obfuscated and updated private matrix and the non-full-column-rank random matrix that is obtained through splitting, to obtain a first private matrix; and storing the first private matrix in a private storage space inside the first participant node;

performing, by the second participant node, private matrix multiplication based on the first obfuscated and updated private matrix and the non-full-row-rank random matrix that is obtained through splitting, to obtain a second private matrix; and storing the second private matrix in a private storage space inside the second participant node;

inputting, by the first participant node and the third participant node, the first private matrix of the first participant node and a private matrix of the second participant node respectively based on the secure two-party matrix multiplication protocol, to perform a first round of secure two-party matrix multiplication; after the first round of secure two-party matrix multiplication is completed, randomly splitting an intermediate computation result of this round into a matrix $V_{a0}$ and a matrix $V_{c0}$ based on a random obfuscation technique; and sending the matrix $V_{a0}$ and the matrix $V_{c0}$ to the first participant node and the third participant node respectively;

inputting, by the second participant node and the third participant node, the second private matrix of the second participant node and a private matrix of the third participant node respectively based on the secure two-party matrix multiplication protocol, to perform a second round of secure two-party matrix multiplication; after the second round of secure two-party matrix multiplication is completed, randomly splitting an intermediate computation result of this round into a matrix $V_{b3}$ and a matrix $V_{c3}$ based on the random obfuscation technique; and sending the matrix $V_{b3}$ and the matrix $V_{c3}$ to the second participant node and the third participant node respectively;

inputting, by the first participant node, the second participant node, and the third participant node, the non-full-column-rank random matrix of the first participant node, the non-full-row-rank random matrix of the second participant node, and the private matrix of the third participant node respectively based on the secure three-party matrix multiplication protocol, to perform a first round of secure three-party matrix multiplication; after the first round of secure three-party matrix multiplication is completed, randomly splitting an intermediate computation result of this round into a matrix $V_{a1}$, a matrix $V_{b1}$, and a matrix $V_{c1}$ based on the random obfuscation technique; and sending the matrix $V_{a1}$, the matrix $V_{b1}$, and the matrix $V_{c1}$ to the first participant node, the second participant node, and the third participant node respectively;

inputting, by the first participant node, the second participant node, and the third participant node, the second obfuscated and updated private matrix of the first participant node, the first obfuscated and updated private matrix of the second participant node, and the private matrix of the third participant node respectively based on the secure three-party matrix multiplication protocol, to perform a second round of secure three-party matrix multiplication; after the second round of secure three-party matrix multiplication is completed, randomly splitting an intermediate computation result of this round into a matrix $V_{a2}$, a matrix $V_{b2}$, and a matrix $V_{c2}$ based on the random obfuscation technique; and sending the matrix $V_{a2}$, the matrix $V_{b2}$, and the matrix $V_{c2}$ to the first participant node, the second participant node, and the third participant node respectively;

secretly summarizing, by the first participant node, the matrix $V_{a0}$, the matrix $V_{a1}$, and the matrix $V_{a2}$ that are intermediate matrices obtained through random splitting; and performing private computation locally;

secretly summarizing, by the second participant node, the matrix $V_{b3}$, the matrix $V_{b1}$, and the matrix $V_{b2}$ that are intermediate matrices obtained through random splitting; and performing private computation locally;

secretly summarizing, by the third participant node, the matrix $V_{c0}$, the matrix $V_{c3}$, the matrix $V_{c1}$, and the matrix $V_{c2}$ that are intermediate matrices obtained through random splitting; and performing private computation locally;

respectively sending, by the first participant node, the second participant node, and the third participant node, final private matrices obtained by summarizing intermediate random split results to the client of secure three-party hybrid multiplication, wherein the client obtains a final computation result through summarization; and implementing, by the client, the joint assessment of resident health levels based on the final computation result.

6. The privacy-preserving computation method for secure three-party matrix hybrid multiplication according to claim 5, wherein the matrix $V_{a0}$ and the matrix $V_{c0}$ satisfy a relationship of $$V_{a0} + V_{c0} = A^* \times C = A_1^* A_2^* \times C = M_0;$$

the matrix $V_{b3}$ and the matrix $V_{c3}$ a relationship of satisfy $$V_{b3} + V_{c3} = B^* \times C = B_1^* B_2^* \times C = M_3;$$

the matrix $V_{a1}$, the matrix $V_{b1}$, and the matrix $V_{c1}$ satisfy a relationship of $$V_{a1} + V_{b1} + V_{c1} = A_1^* \times B_2^* \times C = M_1;$$

the matrix $V_{a2}$, the matrix $V_{b2}$, and the matrix $V_{c2}$ satisfy a relationship of $$V_{a2} + V_{b2} + V_{c2} = B_1^* \times A_2^* \times C = M_2,$$

A* represents the first private matrix, B* represents the second private matrix, C represents the private matrix of the third participant node, At represents the non-full-column-rank random matrix, $A^*_2$ represents the second obfuscated and updated private matrix, $B^*_1$ represents the first obfuscated and updated private matrix, $B^*_2$ represents the non-full-row-rank random matrix, $M_0$ represents a submatrix obtained through the first round of secure two-party multiplication, $M_3$ represents a submatrix obtained through the second round of secure two-party multiplication, $M_1$ represents a submatrix obtained through the first round of secure three-party multiplication, and $M_2$ represents a submatrix obtained through the second round of secure three-party multiplication.

7. A privacy-preserving computation system for secure three-party matrix hybrid multiplication, configured to implement the privacy-preserving computation method for secure three-party matrix hybrid multiplication according to claim 1, wherein each of the three participant nodes exchanges data with the client, and the client is further configured to collect privacy-preserving computation results of the three participant nodes.

8. A privacy-preserving computation system for secure three-party matrix hybrid multiplication, configured to implement the privacy-preserving computation method for secure three-party matrix hybrid multiplication according to claim 2, wherein each of the three participant nodes exchanges data with the client, and the client is further configured to collect privacy-preserving computation results of the three participant nodes.

9. A privacy-preserving computation system for secure three-party matrix hybrid multiplication, configured to implement the privacy-preserving computation method for secure three-party matrix hybrid multiplication according to claim 3, wherein each of the three participant nodes exchanges data with the client, and the client is further configured to collect privacy-preserving computation results of the three participant nodes.

10. A privacy-preserving computation system for secure three-party matrix hybrid multiplication, configured to implement the privacy-preserving computation method for secure three-party matrix hybrid multiplication according to claim 4, wherein each of the three participant nodes exchanges data with the client, and the client is further configured to collect privacy-preserving computation results of the three participant nodes.

11. A privacy-preserving computation system for secure three-party matrix hybrid multiplication, configured to implement the privacy-preserving computation method for secure three-party matrix hybrid multiplication according to claim 5, wherein each of the three participant nodes exchanges data with the client, and the client is further configured to collect privacy-preserving computation results of the three participant nodes.

12. A privacy-preserving computation system for secure three-party matrix hybrid multiplication, configured to implement the privacy-preserving computation method for secure three-party matrix hybrid multiplication according to claim 6, wherein each of the three participant nodes exchanges data with the client, and the client is further configured to collect privacy-preserving computation results of the three participant nodes.

13. The privacy-preserving computation system for secure three-party matrix hybrid multiplication according to claim 7, wherein each of the three participant nodes is further configured to:

split computation tasks based on an asynchronous instruction set of the matched computing protocol, so that different participant nodes perform collaborative computation based on sub-rules corresponding to the participant nodes;

ensure computation synchronization and result consistency through a consensus protocol after receiving a corresponding sub-rule; and send the privacy-preserving computation results to the client after computation is completed.

14. The privacy-preserving computation system for secure three-party matrix hybrid multiplication according to claim 8, wherein each of the three participant nodes is further configured to:

split computation tasks based on an asynchronous instruction set of the matched computing protocol, so that different participant nodes perform collaborative computation based on sub-rules corresponding to the participant nodes;

ensure computation synchronization and result consistency through a consensus protocol after receiving a corresponding sub-rule; and send the privacy-preserving computation results to the client after computation is completed.

15. The privacy-preserving computation system for secure three-party matrix hybrid multiplication according to claim 9, wherein each of the three participant nodes is further configured to:

split computation tasks based on an asynchronous instruction set of the matched computing protocol, so that different participant nodes perform collaborative computation based on sub-rules corresponding to the participant nodes;

ensure computation synchronization and result consistency through a consensus protocol after receiving a corresponding sub-rule; and send the privacy-preserving computation results to the client after computation is completed.

16. The privacy-preserving computation system for secure three-party matrix hybrid multiplication according to claim 10, wherein each of the three participant nodes is further configured to:

split computation tasks based on an asynchronous instruction set of the matched computing protocol, so that different participant nodes perform collaborative computation based on sub-rules corresponding to the participant nodes;

ensure computation synchronization and result consistency through a consensus protocol after receiving a corresponding sub-rule; and send the privacy-preserving computation results to the client after computation is completed.

17. The privacy-preserving computation system for secure three-party matrix hybrid multiplication according to claim 11, wherein each of the three participant nodes is further configured to:

split computation tasks based on an asynchronous instruction set of the matched computing protocol, so that different participant nodes perform collaborative computation based on sub-rules corresponding to the participant nodes;

ensure computation synchronization and result consistency through a consensus protocol after receiving a corresponding sub-rule; and send the privacy-preserving computation results to the client after computation is completed.

* * * * *